US009930247B2

United States Patent
Park et al.

(10) Patent No.: US 9,930,247 B2
(45) Date of Patent: Mar. 27, 2018

(54) MOBILE TERMINAL AND METHOD OF CONTROLLING THE SAME

(71) Applicant: LG ELECTRONICS INC., Seoul (KR)

(72) Inventors: Mihyun Park, Seoul (KR); Mansoo Sin, Seoul (KR); Hyunok Lee, Seoul (KR); Hongjo Shim, Seoul (KR); Yoonwoo Lee, Seoul (KR); Hyunwoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/965,692

(22) Filed: Dec. 10, 2015

(65) Prior Publication Data

US 2017/0041529 A1     Feb. 9, 2017

(30) Foreign Application Priority Data

Aug. 3, 2015 (KR) ........................ 10-2015-0109661

(51) Int. Cl.
*H04N 5/232* (2006.01)
*H04N 5/222* (2006.01)
*H04M 1/00* (2006.01)
*G06F 3/041* (2006.01)

(52) U.S. Cl.
CPC ..... *H04N 5/23216* (2013.01); *H04N 5/23293* (2013.01); *H04N 5/23296* (2013.01)

(58) Field of Classification Search
CPC ..... H04M 1/00; H04N 5/222; H04N 5/23216; H04N 5/23293; H04N 5/23296; G06F 3/041

USPC ........... 348/333.01, 333.02, 333.03–333.12, 348/240.99, 240.1, 240.2, 240.3; 455/566; 396/88

See application file for complete search history.

(56) References Cited

U.S. PATENT DOCUMENTS

| | | |
|---|---|---|
| 2004/0179749 A1 | 9/2004 | Kato et al. |
| 2006/0077263 A1 | 4/2006 | Hosoda |
| 2007/0140675 A1 | 6/2007 | Yanagi |
| 2010/0171863 A1 | 7/2010 | Kim et al. |
| 2010/0173678 A1* | 7/2010 | Kim ................ H04N 5/23216 |
| | | 455/566 |
| 2010/0277620 A1 | 11/2010 | Iijima et al. |
| 2010/0289937 A1* | 11/2010 | Hada ................. G03B 13/00 |
| | | 348/333.01 |

(Continued)

FOREIGN PATENT DOCUMENTS

| | | |
|---|---|---|
| EP | 2207342 A2 | 7/2010 |
| EP | 2574040 A2 | 3/2013 |
| EP | 2824910 A2 | 1/2015 |

(Continued)

*Primary Examiner* — Tuan Ho
*Assistant Examiner* — Marly Camargo
(74) *Attorney, Agent, or Firm* — Birch, Stewart, Kolasch & Birch, LLP

(57) ABSTRACT

A mobile terminal including a camera configured to obtain an image; a display configured to display the obtained image; and a controller configured to receive a zoom input for zooming in on the displayed image, display a zoomed image on a portion of the displayed image in response to the zoom input, and capture at least one of the displayed image and the zoomed image in response to a predetermined input.

16 Claims, 15 Drawing Sheets

(56) References Cited

U.S. PATENT DOCUMENTS

2011/0109581 A1* 5/2011 Ozawa .................. G06F 3/0481
345/173
2014/0375862 A1* 12/2014 Kim .................... H04N 5/23216
348/333.01

FOREIGN PATENT DOCUMENTS

GB           2347575 A    9/2000
JP         2002-33949 A   1/2002

* cited by examiner

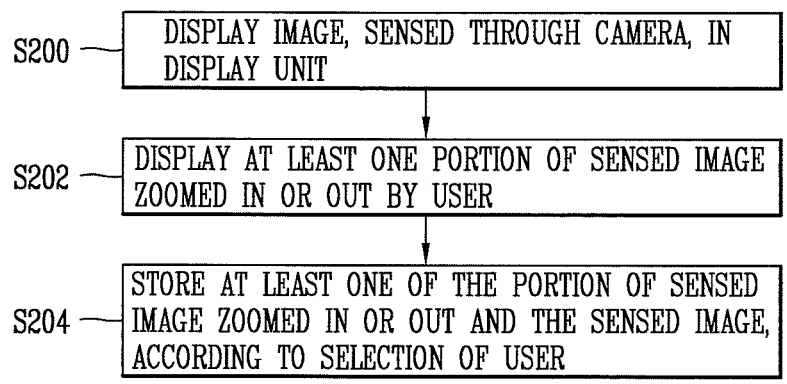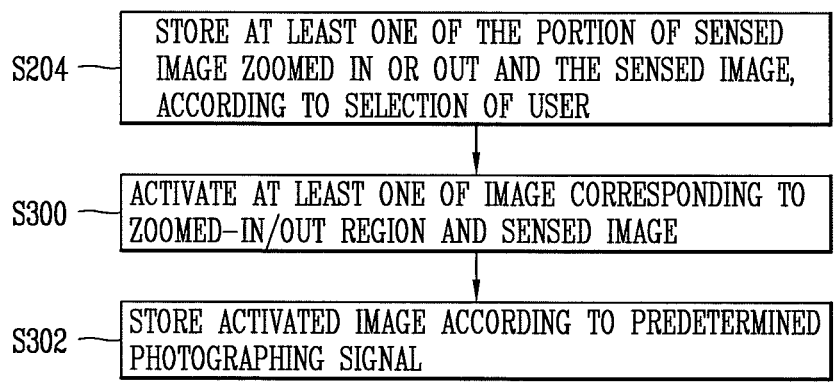

(a)　　　　　　　　(b)

MOBILE TERMINAL AND METHOD OF CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2015-0109661, filed on Aug. 3, 2015, the contents of which is incorporated by reference herein in its entirety.

BACKGROUND OF THE DISCLOSURE

1. Field of the Disclosure

The present disclosure relates to a mobile terminal and a method of controlling the same.

2. Background of the Disclosure

Terminals may be generally classified as mobile/portable terminals or stationary terminals. Mobile terminals may also be classified as handheld terminals or vehicle mounted terminals. Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

With the advancement of technology, mobile terminals have various functions. For example, as functions of current mobile terminals are diversified, the mobile terminals are implemented as multimedia devices having a photographing function of taking a picture or shooting video. Also, current mobile terminals are providing a more variety and number of camera operation modes for capturing an image or shooting video that satisfies needs of a user.

In addition, current mobile terminals can zoom in and display a region, corresponding to a portion of an image sensed by a camera, at a predetermined magnification according to a selection of a user, or may zoom out and display a portion of the zoomed-in image. Also, the current mobile terminals may store the zoomed-in or zoomed-out image in the form of still images or moving images according to a selection of the user. Various methods are being researched for enabling a user to more easily manipulate the various functions of a camera to capture a desired image.

SUMMARY OF THE DISCLOSURE

Therefore, an aspect of the detailed description is to provide a mobile terminal and a method of controlling the same, which enables a user to more easily check a zoomed-in or zoomed-out region of an image sensed by a camera and more easily capture an image corresponding to the zoomed-in or zoomed-out region.

Another aspect of the detailed description is to provide a mobile terminal and a method of controlling the same, which enlarge a user to enlarge and check a portion of an image sensed by a camera and then store the sensed image in the mobile terminal in capturing an image.

Another aspect of the detailed description is to provide a mobile terminal and a method of controlling the same, which enables a user to more easily capture a plurality of images zoomed in or zoomed out at different magnifications in capturing an image.

To achieve these and other advantages and in accordance with the purpose of this specification, as embodied and broadly described herein, a mobile terminal comprising: a camera configured to obtain an image; a display configured to display the obtained image; and a controller configured to: receive a zoom input for zooming in on the displayed image, display a zoomed image on a portion of the displayed image in response to the zoom input, and capture at least one of the displayed image and the zoomed image in response to a predetermined input.

In another aspect of the present invention, a method of controlling a mobile terminal, the method comprising: obtaining, via a camera of the mobile terminal, an image; displaying, via a display of the mobile terminal, the obtained image; receiving, via a controller of the mobile terminal, a zoom input for zooming in on the displayed image; displaying, via the display, a zoomed image on a portion of the displayed image in response to the zoom input; and capturing, via the camera, at least one of the displayed image and the zoomed image in response to a predetermined input.

Further scope of the applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 2 is a flowchart illustrating an operation of capturing, by a mobile terminal according to an embodiment of the present invention, one of a zoom magnification-changed image and an original image according to a selection of a user;

FIG. 3 is a flowchart illustrating an operation of selecting an image, which is to be captured, from among a zoom magnification-changed image and an original image to capture the selected image according to a user input in a mobile terminal according to an embodiment of the present invention;

DETAILED DESCRIPTION OF THE DISCLOSURE

Description will now be given in detail according to the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

Mobile terminals described herein may include cellular phones, smart phones, laptop computers, digital broadcasting terminals, personal digital assistants (PDAs), portable multimedia players (PMPs), navigators, slate PCs, tablet PC, ultra books and the like. However, it may be easily understood by those skilled in the art that the configuration according to the exemplary embodiments of this specification can be applied to stationary terminals such as digital TV, desktop computers and the like excluding a case of being applicable only to the mobile terminals.

Figure 1A:
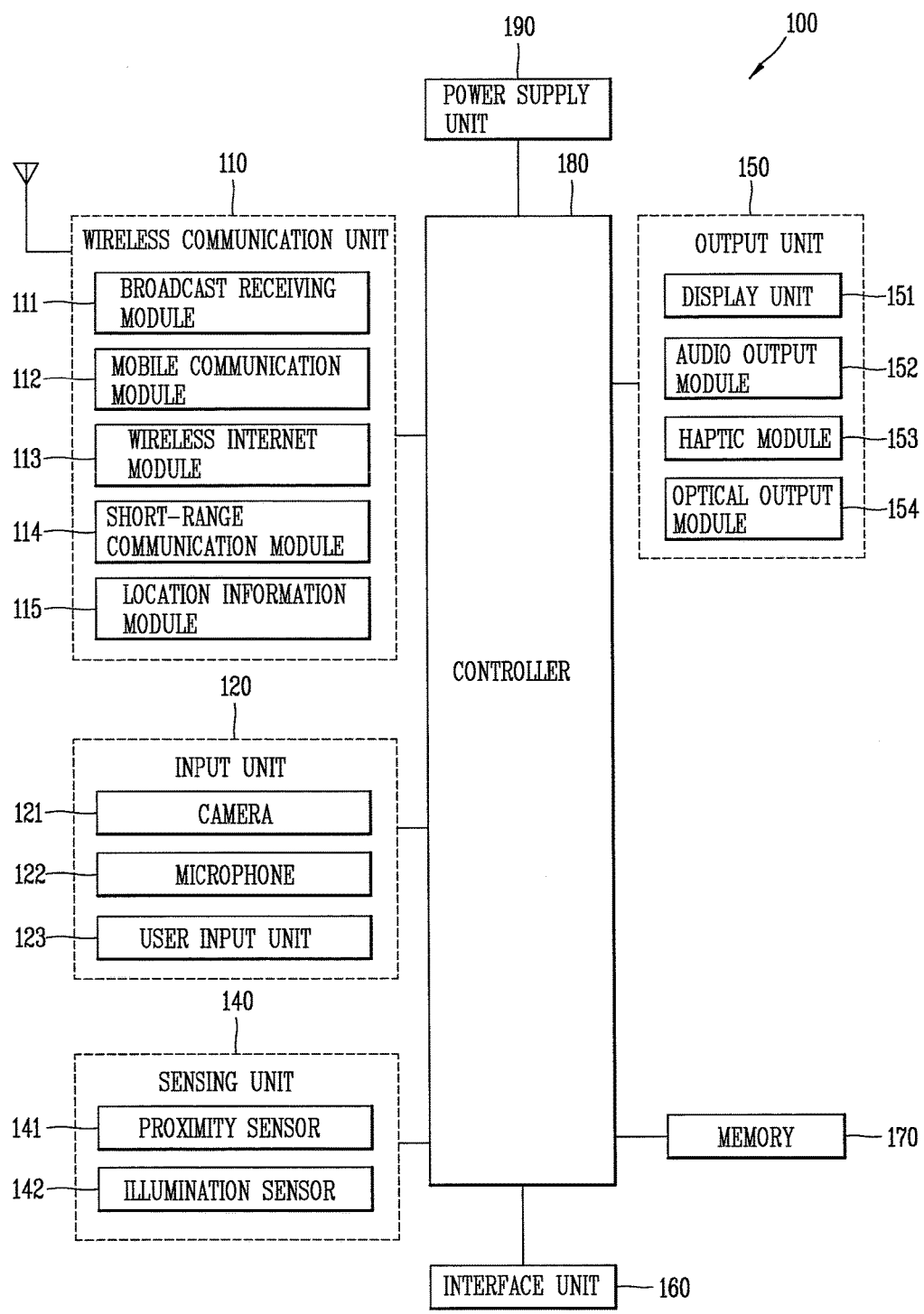
FIG. 1A is a block diagram illustrating describing a mobile terminal according to an embodiment of the present invention.

FIG. 1A is a block diagram of a mobile terminal 100 in accordance with one exemplary embodiment. The mobile terminal 100 can comprise components, such as a wireless communication unit 110, an Audio/Video (A/V) input unit 120, a user input unit 130, a sensing unit 140, an output unit 150, a memory 170, an interface unit 160, a controller 180, a power supply 190 and the like. FIG. 1 shows the mobile terminal 100 having various components, but implementing all of the illustrated components is not a requirement. Greater or fewer components may alternatively be implemented.

The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel. The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112. The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 170. The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The mobile communication module 112 may implement a video call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, Near Field Communication (NFC) and the like. The location information module 115 denotes a module for detecting or calculating a position of a mobile terminal. An example of the location information module 115 may include a Global Position System (GPS) module.

Still referring to FIG. 1A, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 170 or transmitted to the exterior via the wireless communication unit 110. Also, user's position information and the like may be calculated from the image frames acquired by the camera 121. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 160 and an external device.

The output unit 150 is configured to output an audio signal, a video signal or a tactile signal. The output unit 150 may include a display unit 151, an audio output module 152, an alarm unit 153 and a haptic module 154. The display unit 151 may output information processed in the mobile terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display and an e-ink display. Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the displays 151 may be arranged on one surface to be spaced apart from or integrated with each other, or may be arranged on different surfaces. Here, if the display unit 151 and a touch sensitive sensor (referred to as a touch sensor) have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure.

When touch inputs are sensed by the touch sensors, corresponding signals are transmitted to a touch controller. The touch controller processes the received signals, and then transmits corresponding data to the controller 180. Accordingly, controller 180 can sense which region of the display unit 151 has been touched.

Still referring to FIG. 1A, a proximity sensor 141 may be arranged at an inner region of the mobile terminal 100 covered by the touch screen, or near the touch screen. The proximity sensor 141 may be provided as one example of the sensing unit 140. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this instance, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen. The audio output module 152 may convert and output as sound audio data received from the wireless communication unit 110 or stored in the memory 170 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer or the like.

The alarm unit 153 outputs a signal for informing about an occurrence of an event of the mobile terminal 100. Events generated in the mobile terminal may include call signal reception, message reception, key signal inputs, a touch input etc. In addition to video or audio signals, the alarm unit 153 may output signals in a different manner, for example, using vibration to inform about an occurrence of an event. The video or audio signals may be also output via the audio output module 152, so the display unit 151 and the audio output module 152 may be classified as parts of the alarm unit 153.

A haptic module 154 generates various tactile effects the user can feel. A typical example of the tactile effects generated by the haptic module 154 is vibration. The strength and pattern of the haptic module 154 can be controlled. For example, different vibrations may be combined to be output or sequentially output.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or aim of the user, as well as transferring the tactile effect through a direct contact. Two or more haptic modules 155 may be provided according to the configuration of the mobile terminal 100.

The memory 170 may store software programs used for the processing and controlling operations performed by the controller 180, or may temporarily store data (e.g., a phonebook, messages, still images, video, etc.) that are input or output. In addition, the memory 170 may store data regarding various patterns of vibrations and audio signals output when a touch is input to the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 can be operated in relation to a web storage device that performs the storage function of the memory 170 over the Internet.

The interface unit 160 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

When the mobile terminal 100 is connected with an external cradle, the interface unit 160 may serve as a passage to allow power from the cradle to be supplied therethrough to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 can include a multimedia module 181 for reproducing multimedia data. The multimedia module 181 may be configured within the controller 180 or may be configured to be separated from the controller 180.

The controller 180 can perform a pattern recognition processing to recognize a handwriting input or a picture drawing input performed on the touch screen as characters or images, respectively. Also, The controller 180 can execute a lock state to restrict a user from inputting control commands for applications when a state of the mobile terminal meets a preset condition. Also, the controller 180 can control a lock screen displayed in the lock state based on a touch input sensed on the display unit 151 in the lock state of the mobile terminal.

The power supply unit 190 receives external power or internal power and supplies appropriate power required for operating respective elements and components under the control of the controller 180. Various embodiments described herein may be implemented in a computer-readable or its similar medium using, for example, software, hardware, or any combination thereof.

For a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For a software implementation, the embodiments such as procedures or functions described herein may be implemented by separate software modules. Each software module may perform one or more functions or operations described herein. Software codes can be implemented by a software application written in any suitable programming language. The software codes may be stored in the memory 170 and executed by the controller 180.

Figure 1B:
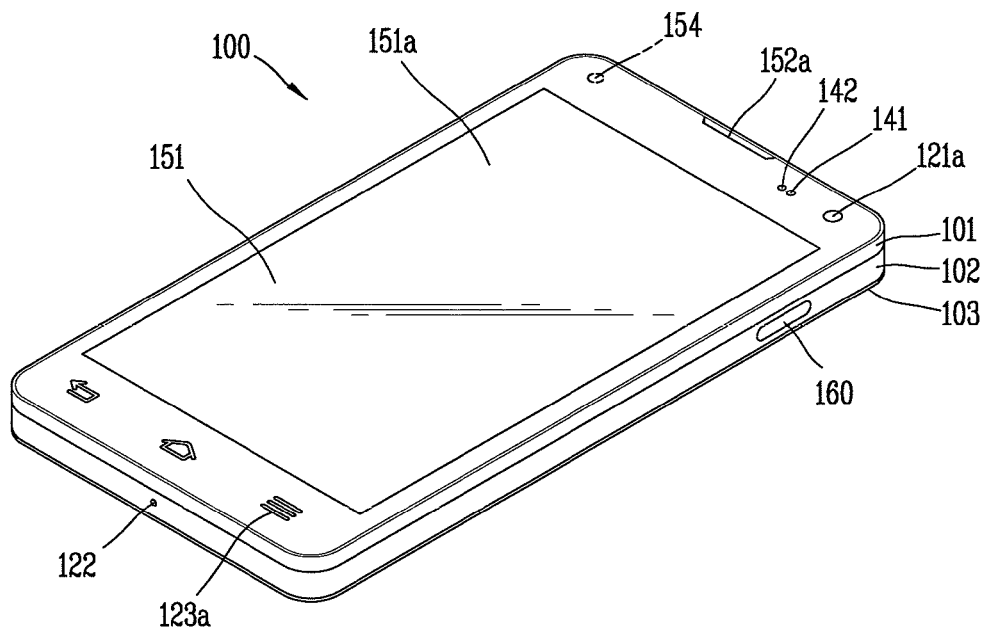
FIGS. 1B and 1C are conceptual diagrams when an example of a mobile terminal according to an embodiment of the present invention is seen in different directions.
Figure 1C:
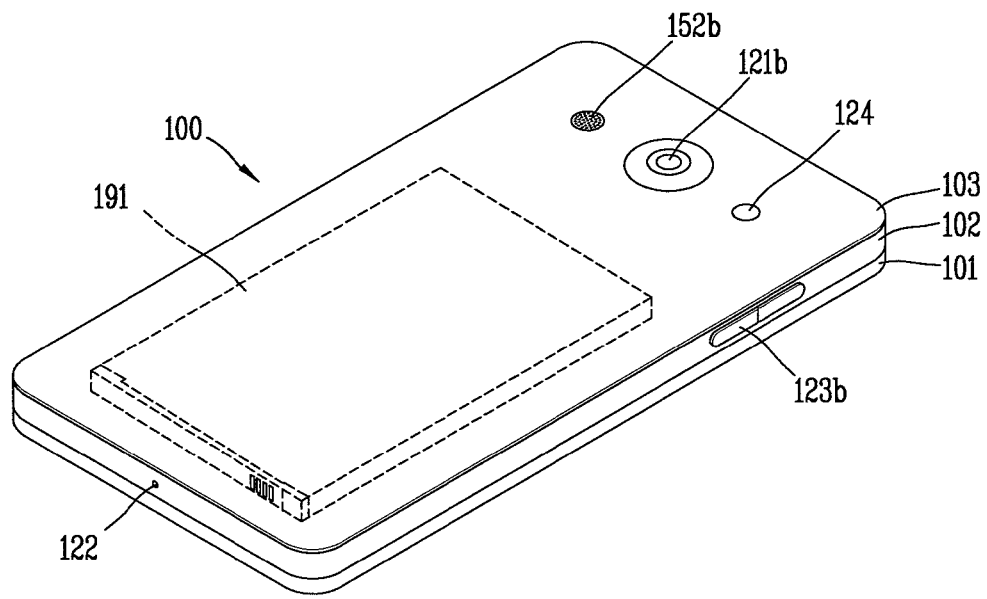

Hereinafter, a structure of the mobile terminal 100 shown in FIG. 1A will be explained with reference to FIGS. 1B and 1C. Referring now to FIGS. 1B and 1C, the mobile terminal 100 is described with reference to a bar-type body. However, the mobile terminal 100 can alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the body to output information. As illustrated, a window 151*a* of the display unit 151 may be mounted to the front case 101 to form the front surface of the body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 can be configured such that one case forms the inner space. In this example, a mobile terminal 100 having a uni-body is formed so synthetic resin or metal extends from a side surface to a rear surface.

If desired, the mobile terminal 100 can include a waterproofing unit for preventing introduction of water into the body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, alternative arrangements are possible and within the teachings of the instant disclosure. Some components may be omitted or rearranged. For example, the first manipulation unit 123*a* may be located on another surface of the body, and the second audio output module 152*b* may be located on the side surface of the body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151*a* and a display on a rear surface of the window 151*a*, or a metal wire which is patterned directly on the rear surface of the window 151*a*. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123*a*.

The first audio output module 152*a* may be implemented in the form of a speaker to output voice audio, alarm sounds, multimedia audio reproduction, and the like. The window 151*a* of the display unit 151 will typically include an aperture to permit audio generated by the first audio output module 152*a* to pass. One alternative is to allow audio to be released along an assembly gap between the structural bodies (for example, a gap between the window 151*a* and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121*a* can process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion, and may employ any tactile method that allows the user to perform manipulation such as touch, push, scroll, or the like. The first and second manipulation units 123*a* and 123*b* may also employ any non-tactile method that allows the user to perform manipulation such as proximity touch, hovering, or the like.

FIG. 1B illustrates the first manipulation unit 123*a* as a touch key, but possible alternatives include a mechanical key, a push key, a touch key, and combinations thereof. Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152*a* or 152*b*, to switch to a touch recognition mode of the display unit 151, or the like.

As another example of the user input unit 123, a rear input unit may be located on the rear surface of the body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152*a* or 152*b*, switch to a touch recognition mode of the display unit 151, and the like. The rear input unit may be configured to permit touch input, a push input, or combinations thereof.

The rear input unit may be located to overlap the display unit 151 of the front side in a thickness direction of the body. As one example, the rear input unit may be located on an upper end portion of the rear side of the body such that a user can easily manipulate it using a forefinger when the user grabs the body with one hand. Alternatively, the rear input unit can be positioned at most any location of the rear side of the body.

Embodiments that include the rear input unit may implement some or all of the functionality of the first manipulation unit 123*a* in the rear input unit. As such, in situations where the first manipulation unit 123*a* is omitted from the front side, the display unit 151 can have a larger screen.

As a further alternative, the mobile terminal 100 can include a finger scan sensor which scans a user's fingerprint. The controller 180 can then use fingerprint information sensed by the finger scan sensor as part of an authentication procedure. The finger scan sensor may also be installed on the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* is shown located at the rear side of the body and includes an image capturing direction that is substantially opposite to the image capturing direction of the first camera unit 121*a*. If desired, second camera 121*a* may alternatively be located at other locations, or made to be moveable, in order to have a different image capturing direction from that which is shown.

The second camera 121*b* can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

As shown in FIG. 1C, a flash 124 is shown adjacent to the second camera 121*b*. When an image of a subject is captured with the camera 121*b*, the flash 124 may illuminate the subject. As shown in FIG. 1C, the second audio output module 152*b* can be located on the body. The second audio output module 152*b* may implement stereophonic sound functions in conjunction with the first audio output module 152*a*, and may be also used for implementing a speaker phone mode for call communication.

At least one antenna for wireless communication may be located on the body. The antenna may be installed in the body or formed by the case. For example, an antenna which configures a part of the broadcast receiving module 111 may be retractable into the body. Alternatively, an antenna may be formed using a film attached to an inner surface of the rear cover 103, or a case that includes a conductive material.

A power supply unit 190 for supplying power to the mobile terminal 100 can include a battery 191, which is mounted in the body or detachably coupled to an outside of the body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 can be provided. The cover or pouch may cooperate with the display unit 151 to extend the function of the mobile terminal 100. Another example of the accessory is a touch pen for assisting or extending a touch input to a touch screen.

Hereinafter, a control method implemented in the mobile terminal 100 and exemplary embodiments thereof will be described in detail with reference to the accompanying drawings. It is obvious to those skilled in the art that the present invention may be implemented in another specific form without departing from the spirit and essential features of the present invention.

FIG. 2 is a flowchart illustrating an operation of capturing, by the mobile terminal 100 according to an embodiment of the present invention, one of a zoom magnification-changed image and an original image according to a selection of a user. As shown in FIG. 2, in operation S200, the controller 180 of the mobile terminal 100 displays an image, sensed by the camera 121, on the display unit 151. That is, the image sensed by the camera 121 may be displayed in a preview state on the display unit 151. The image which is displayed in the preview state may be captured and stored in the form of still images or moving images according to a selection of a user, for example, according to an input of a photographing key. Hereinafter, an image which is sensed by the camera 121 but is not zoomed in or zoomed out may be referred to as an original image.

When the image is displayed in the preview state in operation S200, the controller 180 can zoom in or out the image sensed by the camera 121 according to a selection of the user. For example, the controller 180 can zoom in or out the image, based on a predetermined touch gesture such as a pinch-in gesture or a pinch-out gesture applied to the display unit 150 or a user touch input applied to a scroll bar displayed by the display unit 151. Here, the zoom-in operation may include an optical zoom-in operation using changing of a focal distance, in addition to a digital zoom-in operation, and the zoom-out operation may include an optical zoom-out operation using changing of the focal distance, in addition to a digital zoom-out operation.

In operation S202, when the zoom-in operation or the zoom-out operation is performed as described above, the controller 180 can display, on the display unit 151, image information associated with the zoom-in operation or the zoom-out operation.

For example, in operation S202, the controller 180 can display the zoomed-in image, obtained by zooming in the image sensed by the camera 121, on at least one region of the display unit 151. In this instance, the controller 180 can display, on the display unit 151, an original image and an image corresponding to the zoomed-in region. The image corresponding to the zoomed-in region can be displayed to overlap the original image with respect to a specific point for which the zoom-in operation is performed in the original image.

Alternatively, in operation S202, the controller 180 can mark, by using a predetermined graphic object, a region zoomed in by the user on the original image which is displayed in the preview state by the display unit 151. Here, the predetermined graphic object may be at least one guide line which is marked on an image in the preview state. The guide line may correspond to at least one predetermined zoom magnification and may be used to display a region of the original image which is to be displayed by the display unit 151 when zoomed in according to the predetermined zoom magnification. That is, the at least one guide line may indicate a region of the original image capable of being zoomed in according to a zoom magnification corresponding thereto.

That is, in operation S202, the controller 180 can mark at least one guide line, which is set based on different zoom magnifications according to a selection of the user, on the original image which is displayed in the preview state. Also, the controller 180 can not display the image, corresponding to the zoomed-in region, on the display unit 151. In this instance, when an image is captured at a zoom magnification corresponding to the at least one guide line, the at least one guide line may enable the user to identify a portion of the original image corresponding to the zoomed-in region which is captured. Accordingly, according to an embodiment of the present invention, the user can more easily check which portion of an image currently sensed by a camera is zoomed in.

Hereinafter, an example of displaying the image, corresponding to the region which is zoomed in operation S202, to overlap the original image or displaying the zoomed-in region by using the at least one guide line marked on the original image will be described in more detail with reference to FIGS. 7 and 8.

While the region zoomed in from the original image or the image corresponding to the zoomed-in region is being displayed by the display unit 151 in operation S202, the controller 180 can store at least one of the original image and the image corresponding to the zoomed-in region according to a selection of the user in operation S204. For example, in operation S204, the controller 180 can activate at least one of the original image and the image corresponding to the zoomed-in region according to a selection of the user. Also, when an input of a predetermined key (for example, a photographing key), a voice input, or a gesture is sensed, the controller 180 can store (i.e., capture) the activated at least one image.

For example, when the zoom-in operation is a digital zoom-in operation which is performed in a digital method, an operation of capturing the image corresponding to the zoomed-in region may be performed in various methods in operation S204. For example, in a case of simultaneously capturing the original image and the image corresponding to the zoomed-in region, the controller 180 can first capture the original image, may capture an image which is obtained by enlarging at least a partial region of the original image according to a magnification at which the zoomed-in region is zoomed in from the original image, and may store the image corresponding to the zoomed-in region. Further, when only an operation of capturing the image corresponding to the zoomed-in region among the original image and the image corresponding to the zoomed-in region is selected, the controller 180 can store only an image which is obtained by enlarging at least a partial region of a currently sensed image according to a currently selected zoom-in magnification.

When the zoom-in operation is performed in an optical zoom method, the zoom-in operation may be performed in a method similar to the above-described method. That is, in a case of simultaneously capturing the original image and the image corresponding to the zoomed-in region, the controller 180 can first capture the original image and may store an image corresponding to a region which is optically zoomed in according to a currently selected zoom-in magnification. Further, the controller 180 can first capture the image corresponding to the region which is optically zoomed in according to the currently selected zoom-in magnification.

In the above description, only a case where the zoom-in operation is performed has been described as an example. However, when a zoom-out operation is performed, the zoom-out operation may be performed in a method similar to the above-described method. In this instance, the display unit 151 may a zoomed-out image and an image (i.e., an image which has been zoomed in at a certain zoom magnification) of before being zoomed out, and the controller 180 can divide and display, on the display unit 151, the zoomed-out image and the image of before being zoomed out by using a border-shaped guide line which is displayed near the zoomed-out image and the image of before being zoomed out. A case where the zoom-out operation is performed may be the same as or similar to a case of sensing an image at a lower zoom magnification in a state of sensing the image at a higher zoom magnification. Therefore, for convenience of description, a case where the zoom-in operation is performed will be described below as an example. Also, as described above, an embodiment of the present invention may be applied to a case of using optical zoom. Therefore, for convenience of description, a case of using digital zoom will be described below as an example.

As described above in operation S204, the controller 180 of the mobile terminal 100 according to an embodiment of the present invention may store at least one of an image zoomed in at a certain magnification and the original image according to a selection of the user in a state of displaying, on the display unit 151, the zoomed-in image and the original image That is, the controller 180 can store only one of the zoomed-in image and the original image according to a selection of the user, and Thus, the controller 180 can display, to the user, an image which is to be stored according to a selection of the user. Hereinafter, a state where at least one of a plurality of images displayed by the display unit 151 is selected as an image, which is to be stored, according to a selection of the user can be referred to as an activated state.

FIG. 3 is a diagram illustrating in more detail an operation of displaying an image, which is to be captured, from among a zoom magnification-changed image and an original image, activating one of displayed images, and storing the activated image in the mobile terminal 100 according to an embodiment of the present invention.

In addition, the controller 180 of the mobile terminal 100 according to an embodiment of the present invention can display, on the display unit 151, information of an image, which is to be captured, among the original image and the image for which the zoom magnification has been changed in operation S202 of FIG. 2. For example, as described above, the controller 180 can display an image corresponding to a partial region, for which a zoom magnification has been changed from the original image, on the display unit 151 in a state of overlapping at least a portion of the original image. Alternatively, the controller 180 can display a partial region of an original region, which is to be stored according to a changed zoom magnification, on the display unit 151 through a plurality of guide lines marked on the original image.

In this state, in operation S300, the controller 180 can select at least one image from among an image corresponding to a region, for which a zoom magnification is changed according to the zoom-in operation or the zoom-out operation being performed, and the original image sensed by the camera 121 according to a user input. For example, while a plurality of images are being displayed by the display unit 151, the controller 180 can select an image which is to be captured, based on a touch input applied to the display unit 151 in which at least one image is displayed. Alternatively, the original image may be divided into a plurality of regions according to a plurality of guide lines displayed by the display unit 151, and the controller 180 can select an image which is to be captured, based on a user touch input for selecting at least one of the regions of the original image. In this instance, the controller 180 can display an image (i.e., an activated image), which is currently selected according to a selection of the user, to be distinguished from another image or another zoom magnification.

In operation S300, the controller 180 can display, on the display unit 151, an image corresponding to the activated region in various forms to be distinguished from other images. For example, the controller 180 can display, on the display unit 151, a periphery of the image corresponding to the activated region through a predetermined border-shaped graphic object, or may process an image corresponding to another region, instead of the activated region, to be blackened/whitened or to be semitransparent. In this instance, an image corresponding to a deactivated region may be blurredly or unclearly displayed, and thus, the user can check a currently deactivated state. Hereinafter, an example where an activated region is displayed to be distinguished from a deactivated region will be described in more detail with reference to FIGS. 9 to 11.

When the image corresponding to the activated region is displayed to be distinguished from other images in operation S300, the controller 180 can store an image corresponding to a currently activated region according to a selection of the user in operation S302. For example, when an input of a specific key (for example, the photographing key), a voice signal, or a predetermined gesture is sensed, the controller 180 can capture the image corresponding to the activated region, and the captured image may be stored in the memory 170.

Figure 4:
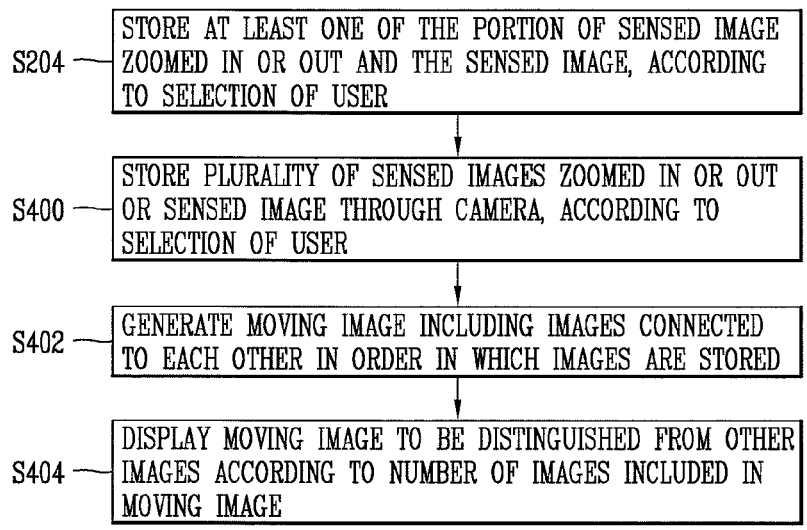
FIG. 4 is a flowchart illustrating an operation of generating, by a mobile terminal according to an embodiment of the present invention, a moving image by using images captured based on different zoom magnifications.

The image corresponding to the region for which the zoom magnification is changed may be displayed in plurality. For example, the controller 180 can simultaneously display, on the display unit 151, a plurality of images which are displayed at different zoom magnifications. Also, the controller 180 can display, on the display unit 151, some regions of an original region, which is to be stored according to different zoom magnifications, by using a plurality of guide lines corresponding to the different zoom magnifications. FIG. 4 illustrates an operation of generating, by the mobile terminal 100 according to an embodiment of the present invention, a moving image by using a plurality of images captured based on different zoom magnifications.

Figure 12:
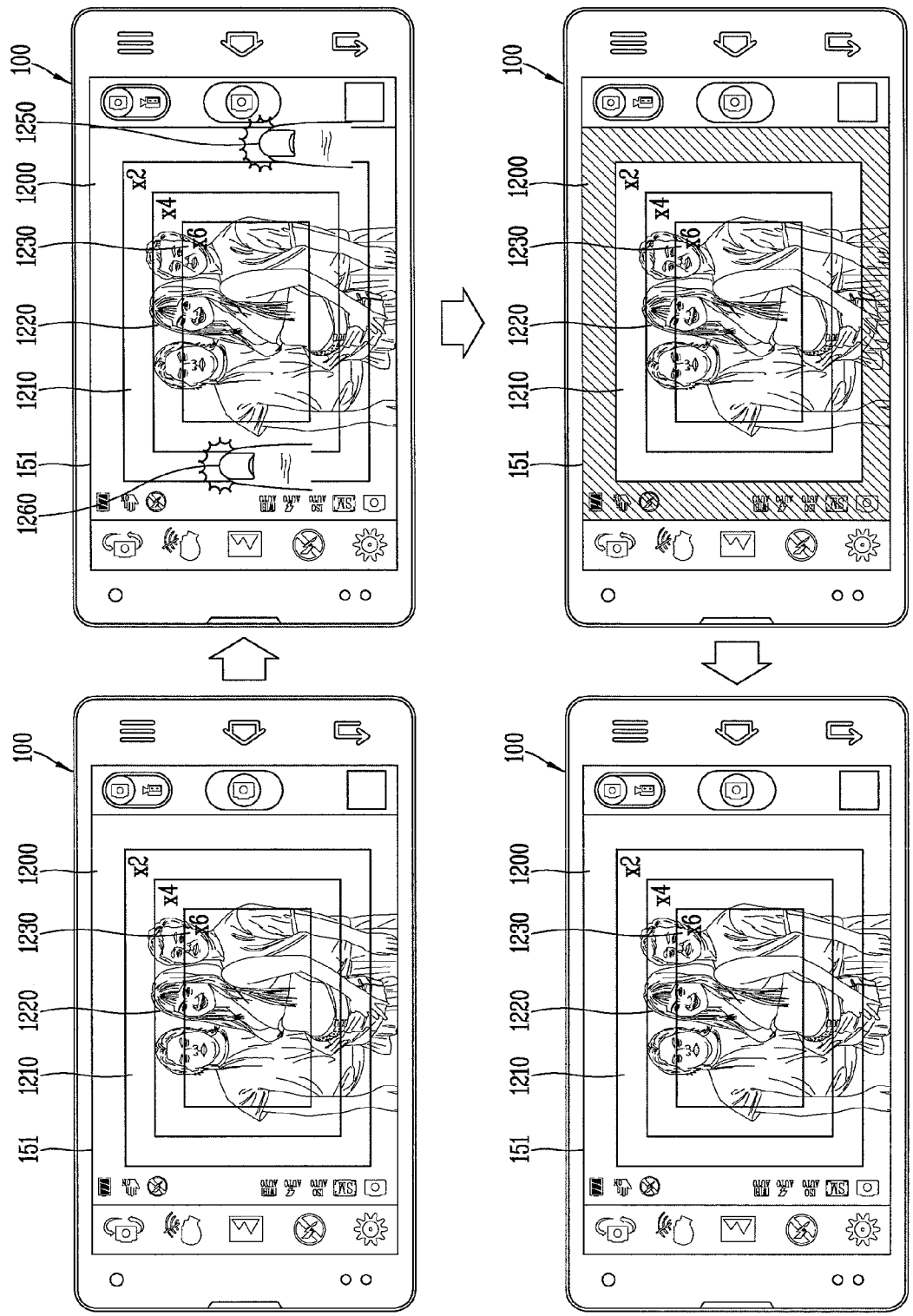
FIG. 12 is an exemplary diagram illustrating an example of capturing, by a mobile terminal according to an embodiment of the present invention, a plurality of images at different zoom magnifications.

As shown in FIG. 4, while the zoomed-in region or the image corresponding to the zoomed-in region is being displayed by the display unit 151 in operation S204 of FIG. 2, the controller 180 can store the image corresponding to the zoomed-in region or the original image according to a selection of the user. Here, as described above, the zoomed-in image may include a plurality of images which are zoomed in according to different zoom magnifications, and in this instance, the controller 180 can store the zoomed-in plurality of images or the original image according to a selection of the user in operation S400. Here, the controller 180 can perform control to capture the zoomed-in plurality of images or the original image in an order selected by the user, namely, in an activated order. FIG. 12 illustrates an example where a plurality of images zoomed in at different zoom magnifications are sequentially captured in an order selected by a user in the mobile terminal 100 according to an embodiment of the present invention.

When the zoomed-in plurality of images or the original image are/is stored in operation S400, the controller 180 can connect the stored images in an order, in which the images are stored, to generate a moving image in operation S402. That is, the controller 180 can set an order in which the images are displayed on the display unit 151, based on an order in which the stored images are captured and may display each of the images on the display unit 151 for a predetermined time, and when the predetermined time elapses, the controller 180 can perform control in order a next-order image to be displayed by the display unit 151, thereby generating the moving image including the images which are connected to each other.

When the moving image composed of the stored images is generated in operation S402, the controller 180 can display the generated moving image to be distinguished from other images. For example, the controller 180 can mark the number of the image, constituting the generate moving image, on a graphic object (for example, a thumbnail image) corresponding to the generated moving image. An example of generating a moving image from a plurality of images zoomed in at different magnifications and displaying an icon corresponding to the moving image will be described in more detail with reference to FIGS. 13 and 14.

Figure 5:
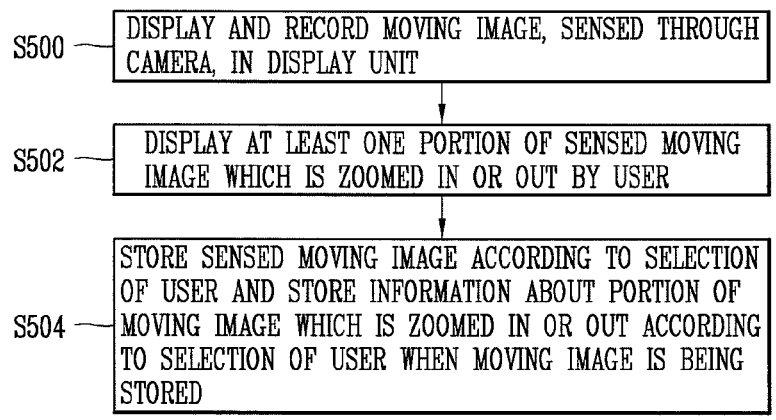
FIG. 5 is a flowchart illustrating an operation of storing, by a mobile terminal according to an embodiment of the present invention, information of a zoomed-in or zoomed-out region when capturing a moving image.

An embodiment of the present invention may be applied to a case of storing a moving image as well as a still image. FIG. 5 is a flowchart illustrating an operation of the mobile terminal 100 according to an embodiment of the present invention when storing a moving image.

As shown in FIG. 5, the controller 180 of the mobile terminal 100 according to an embodiment of the present invention can display, on the display unit 151, a moving image sensed through the camera 121. Also, the sensed moving image may be displayed in the preview state by the display unit 151 and may be recorded according to a selection of the user (for example, a selection of a record key or the like) in operation S500. Hereinafter, a moving image which is not zoomed in or out may be referred to as an original moving image.

In this state, the controller 180 can zoom in or out an image corresponding to a partial region of the recorded moving image, based on the predetermined touch gesture such as the pinch-in gesture or the pinch-out gesture applied to the display unit 150 or a user touch input applied to a scroll bar displayed by the display unit 151. In operation S502, the controller 180 can display, on the display unit 151, image information of a region which is zoomed in from the original moving image displayed by the display unit 151.

Similarly to a case of the still image, in operation S502, the controller 180 can display, on the display unit 151, an image corresponding to the region zoomed in from the original moving image by using a plurality of guide lines respectively corresponding to different zoom magnifications. Alternatively, the controller 180 can display, on the display unit 151, at least a portion of the original moving image which is zoomed in at a specific magnification. In this instance, the image zoomed in at the specific magnification may be displayed on a portion of a screen on which a currently recorded moving image is displayed. Therefore, while the moving image is being recorded, the display unit 151 may simultaneously display an image, which is zoomed in at a magnification selected by the user, and the original moving image which is not zoomed in.

When the moving image is recorded as described above, the controller 180 can store the moving image sensed by the camera 121. In this instance, while the original moving image is being recorded, the controller 180 can store information of a zoom magnification of the original moving image in operation S504. Here, the information of the zoom magnification of the original moving image may include a magnification at which the original moving image is zoomed in, a time when a user input for performing the zoom-in operation is received, and information of one point of the display unit 151, to which a touch input corresponding to the zoom-in operation is applied, in a region of the display unit 151 displaying the original moving image. Also, the stored information of the zoom magnification may be displayed through a predetermined graphic object when the recorded moving image is reproduced.

Therefore, according to an embodiment of the present invention, even when a zoom magnification is changed in the middle of recording an original moving image, the original moving image may be continuously recorded irrespective of the changing of the zoom magnification. Subsequently, in reproducing the recorded moving image, an image which has been zoomed in at a specific magnification may be displayed on a portion of a screen on which the reproduced moving image is displayed, based on a selection of the user which is made through a graphic object displayed based on the zoom magnification.

In operation S502, a zoom-in operation based on a selection of the user can be performed according to a predetermined specific gesture. That is, when the predetermined specific gesture is sensed, the controller 180 can zoom in only a partial region of the original moving image according to a selected zoom magnification without changing the zoom magnification of the original moving image which is currently recorded as described in operation S504. Further, when a general zoom-in function is selected, namely, when the zoom-in function is selected without the predetermined specific gesture, the controller 180 can record an image for which a zoom magnification has been changed.

Figure 6:
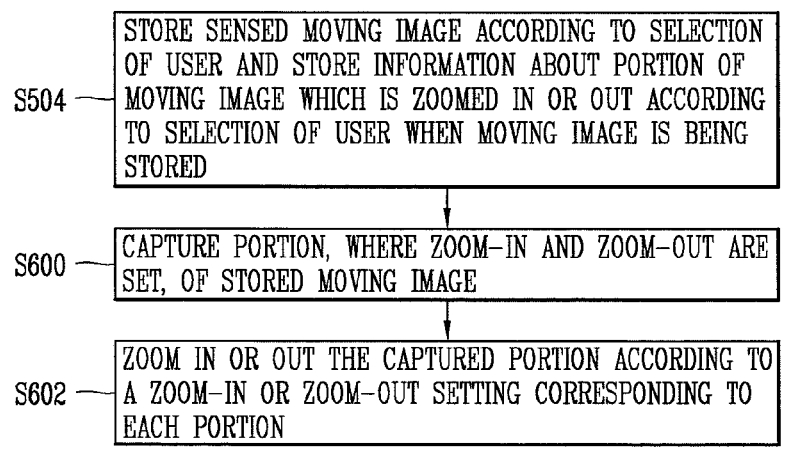
FIG. 6 is a flowchart illustrating an operation of storing, by the mobile terminal according to an embodiment of the present invention, an image as the information of the zoomed-in or zoomed-out region when capturing a moving image.

When the magnification at which the original moving image is zoomed in, the time when the user input for performing the zoom-in operation is received, and the information of the one point of the display unit 151 to which the touch input corresponding to the zoom-in operation is applied may be stored as the information of the zoom magnification of the original moving image in operation S504 of FIG. 5, has been described above as an example, but the present embodiment is not limited thereto. In other embodiments, an image which is displayed and zoomed in according to the predetermined touch input gesture may be stored as the information of the zoom magnification of the original moving image. FIG. 6 illustrates an operation of storing, by the mobile terminal 100 according to an embodiment of the present invention, the zoomed-in image as the information of the zoomed-in or zoomed-out region.

As shown in FIG. 6, when the image which has been zoomed in at the specific zoom magnification based on the selection of the user in operation S502 of FIG. 5 is displayed on a portion of a screen on which a currently recorded moving image is displayed, or a guide line corresponding to the specific zoom magnification is selected by the user, the controller 180 can store an image corresponding to a partial region, which has been zoomed in from an original moving image according to the specific zoom magnification, as a still image or a moving image separately from a currently recorded original moving image in operation S600.

For example, the controller 180 can capture an image corresponding to a region, which has been zoomed in from the currently recorded original moving image according to the specific zoom magnification, as a still image or a moving image. Also, in operation S602, the controller 180 can zoom in the captured region of the recorded original moving image according to the specific zoom magnification to store an image corresponding to the zoomed-in region as a still image or a moving image. Therefore, while an image sensed by the camera 121 is being recorded as a moving image, the mobile terminal 100 can zoom in a portion of the recorded moving image according to a selection of the user to store an image corresponding to the zoomed-in portion as a still image or a separate moving image. In this instance, the stored still image or separate moving image may be displayed or reproduced separately from the original moving image.

In addition, the controller 180 can generate a moving image composed of a still image or a moving image which is captured from the recorded original moving image. Also, when reproduction of the generated moving image is selected, the controller 180 can sequentially display and reproduce, on the display unit 151, the captured still image and moving image in an order in which the captured still image and moving image are zoomed in.

In the above description, an operation where the controller 180 of the mobile terminal 100 according to an embodiment of the present invention stores at least one image according to a selection of the user while an original image and an image which has been zoomed in at a specific zoom magnification are being displayed by the display unit 151 will be described in more detail with reference to a flowchart.

In the following description, an example where the mobile terminal 100 according to an embodiment of the present invention displays the original image and an image zoomed in at a specific zoom magnification and an example where the mobile terminal 100 stores the original image and the zoomed-in image will be described in more detail with reference to exemplary diagrams.

Figure 7:
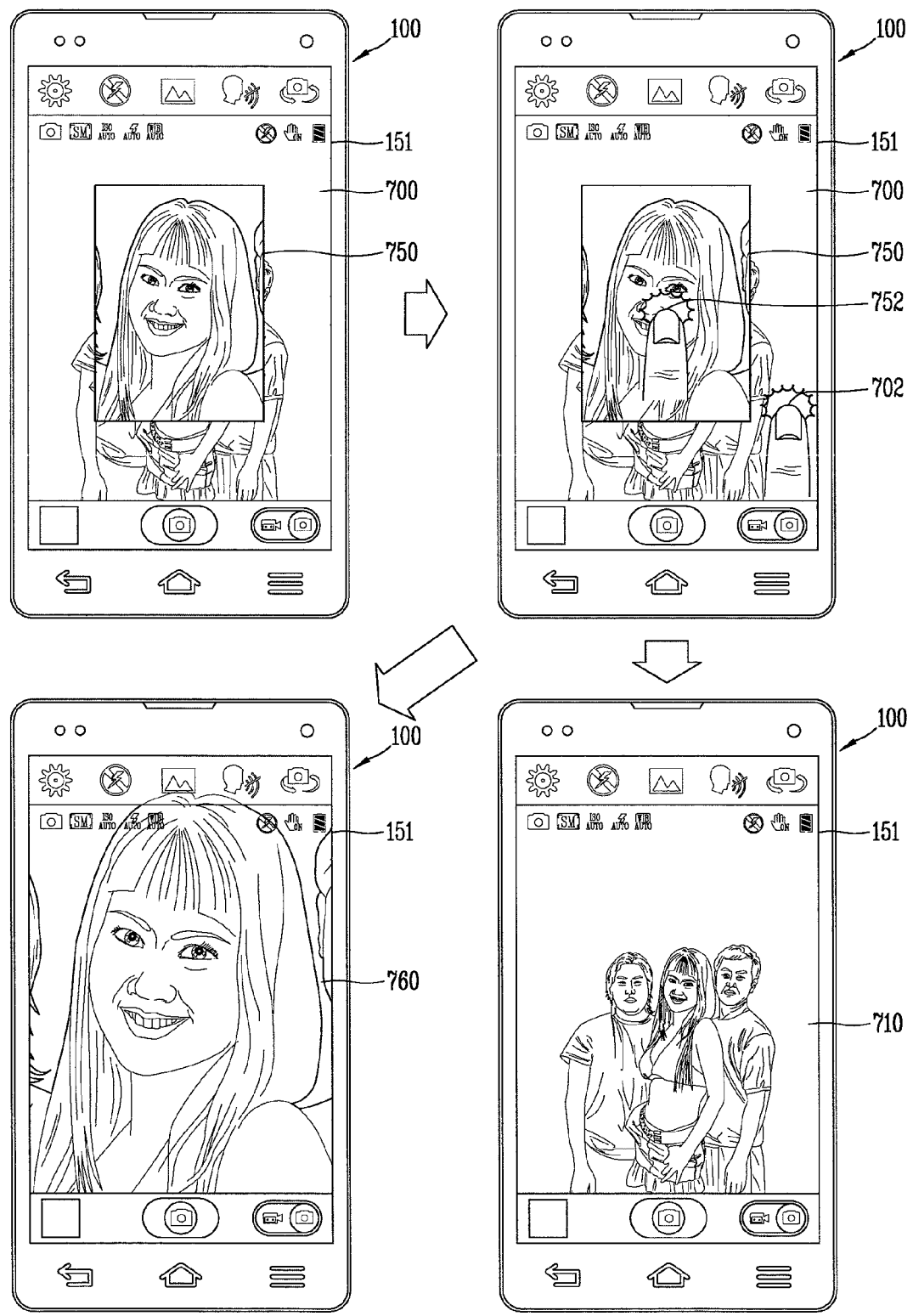
FIG. 7 is an exemplary diagram illustrating an example of capturing, by a mobile terminal according to an embodiment of the present invention, one of a zoomed-in image and an original image, which are being displayed together, according to a selection of a user.

FIG. 7 is a diagram illustrating an example of capturing, by the mobile terminal 100 according to an embodiment of the present invention, one of a zoomed-in image and an original image, which are being displayed together, according to a selection of a user. When an image is zoomed in according to a selection of the user, the mobile terminal 100 according to an embodiment of the present invention may display the zoomed-in image on a predetermined partial region of the display unit 151. Here, the zoomed-in image may be provided with respect to one point of an image sensed through the camera 121, and the one point may a point which is selected by the user when setting the zoom-in operation.

That is, if the zoom-in operation is performed according to a predetermined user touch input (for example, a pinch-out input) applied to the display unit 151, the controller 180 can perform the zoom-in operation with respect to one point of the display unit 151 based on the predetermined user touch input. In this instance, a partial region of the sensed image may be zoomed in with respect to the one point based on the predetermined user touch input. Also, the zoomed-in image may be displayed on a predetermined region of the display unit 151 which is provided with respect to the one point based on the predetermined user touch input.

Therefore, as illustrated in a first drawing of FIG. 7, the mobile terminal 100 can display, on the display unit 151, an image sensed through the camera 121, namely, an original image 700 and an image 750 which is generated by zooming in a portion of the sensed image. That is, as illustrated in the first drawing of FIG. 7, the zoomed-in image 750 may be displayed to overlap a portion of a region of the display unit 151 displaying the original image 700. A size of the predetermined region may be determined according to a zoom magnification based on the predetermined user touch input or a selection of the user.

When the original image 700 and the zoomed-in image 750 are displayed by the display unit 151 as illustrated in the first drawing of FIG. 7, the controller 180 can capture one image according to a selection of the user. For example, as illustrated in a second drawing of FIG. 7, while the original image 700 and the zoomed-in image 750 are all being displayed by the display unit 151, the controller 180 can capture one image according to a user touch input which is made for one of a region on which the original image 700 is displayed and a region on which the zoomed-in image 750 is displayed.

That is, while an image is being displayed as illustrated in the second drawing of FIG. 7, when the user applies a touch input 702 to one point of a region of the display unit 151 displaying the original image 700, the controller 180 can sense the touch input 702 as a selection of the user for capturing the original image 700. Therefore, the controller 180 can capture the original image 700, and the display unit 151 can display a captured image 710 in the form of still images. An example of such a case is illustrated in a third drawing of FIG. 7.

While an image is being displayed as illustrated in the second drawing of FIG. 7, when the user applies a touch input 752 to one point of a region of the display unit 151 displaying the zoomed-in image 750, the controller 180 can sense the touch input 752 as a selection of the user for capturing the zoomed-in image 750. Therefore, the controller 180 can capture the zoomed-in image 750, and the display unit 151 may display a captured image 760 in the form of still images. An example of such a case is illustrated in a fourth drawing of FIG. 7.

In FIG. 7, an example where the display unit 151 displays an image which has been zoomed in according to a selection of the user is illustrated, but the present embodiment is not limited thereto. In other embodiments, the zoomed-in image may be captured in various methods. For example, in the present embodiment, a zoomed-in image may be captured by using a plurality of guide lines respectively corresponding to different zoom magnifications. An example of such a case is illustrated in FIG. 8.

For example, when a zoom-in function is selected, the mobile terminal 100 can display a plurality of guide lines, respectively corresponding to different zoom magnifications, on the display unit 151 which displays an image (i.e., an original image) sensed by the camera 121. Also, each of the guide lines may include information of a zoom magnification corresponding thereto. For example, the controller 180 can control the display unit 151 to display the information (i.e., ×2, ×4, ×6, and/or the like) of the zoom magnification, corresponding to each of the guide lines, near a corresponding guide line. In this instance, in an original image 800, a zoom magnification may be marked as ×1, or may not be marked. An example of such a case is illustrated in a first drawing of FIG. 8.

Figure 8:
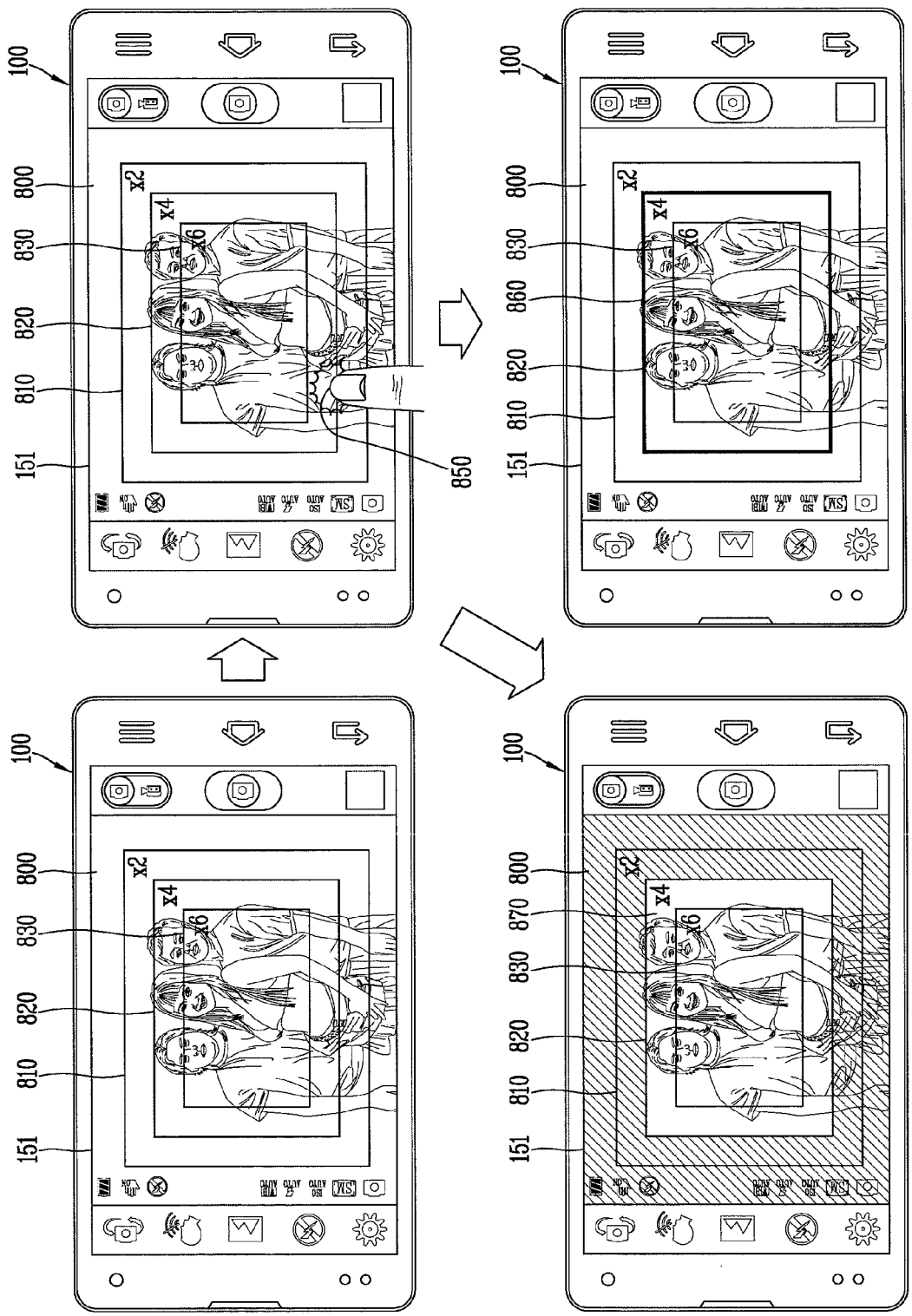
FIG. 8 is an exemplary diagram illustrating an example where a mobile terminal according to an embodiment of the present invention displays, through a guide line, a region which is selected and captured at a selected zoom magnification in a sensed image.

When using a guide line as described above, a plurality of guide lines 810, 820 and 830 respectively corresponding to different zoom magnifications may be marked on the original image 800 as illustrated in the first drawing of FIG. 8. Here, when an image is zoomed in according to a specific zoom magnification as described above, each of the guide lines 810, 820 and 830 may be used to display at least a portion of an original image capable of being displayed by the display unit 151.

That is, when an image is captured at a zoom magnification (for example, six times magnification) corresponding to a first guide line 810 of the guide lines 810, 820 and 830 in a current state, a portion of the original image 800 added by the first guide line 830 may be a region of the original image 800 displayed by the display unit 151. Also, when an image is captured at a zoom magnification (for example, four times magnification) corresponding to a second guide line 820 in a current state, a portion of the original image 800 added by the second guide line 820 may be a region of the original image 800 displayed by the display unit 151. Also, when an image is captured at a zoom magnification (for example, two times magnification) corresponding to a third guide line 810 in a current state, a portion of the original image 800 added by the third guide line 810 may be a region of the original image 800 displayed by the display unit 151.

While the plurality of guide lines 810, 820 and 830 respectively corresponding to different magnifications are being displayed, the controller 180 can sense a user touch input applied to one of regions of the original image 800 which are divided by the guide lines 810, 820 and 830. Also, a zoom magnification can be determined based on one point of the display unit 151 from which the user touch input is sensed. For example, the controller 180 can determine that a highest zoom magnification of zoom magnifications, at which a portion of the original image 800 corresponding to one point from which the user touch input is sensed, is selected by the user.

Therefore, as illustrated in a second drawing of FIG. 8, when a user touch input is sensed between the region of the original image 800 added by the second guide line 820 and the region of the original image 800 added by the first guide line 830, the controller 180 can sense the touch input 850 as a touch input for capturing the original image 800 at a zoom magnification (i.e., four times zoom magnification) based on the second guide line 820. Therefore, when a user input (for example, an input of the photographing key) for capturing an image is sensed, the controller 180 can store an image, zoomed in at four times magnification, in the memory 170.

In addition, when a region of the original image 800 corresponding to one of the guide lines 810, 820 and 830 is selected by the user, the controller 180 can display the selected region on the display unit 151 to be distinguished from other regions. That is, as illustrated in a third drawing of FIG. 8, the controller 180 can display, on the display unit 151, a border of a specific guide line (for example, the second guide line 820) corresponding to the zoom magnification selected by the user to be distinguished from other guide lines.

Alternatively, as illustrated in a fourth drawing of FIG. 8, when an image is zoomed in according to a zoom magnification selected by the user, the controller 180 can display, on the display unit 151, a partial region of the original image 800 displayed by the display unit 151 to be distinguished from other regions of the original image 800. Therefore, even though an image is zoomed in at a specific zoom magnification, as illustrated in FIG. 8, the zoomed-in image is not displayed by the display unit 151, the controller 180 can enable the user to identify a region which is captured according to a zoom magnification selected by the user, thereby enabling the user to more easily check and capture a region zoomed-in from the original image 800.

The guide lines 810, 820 and 830 may be used for preventing an image from being zoomed in or out at a zoom magnification which is equal to or higher than a certain zoom magnification. For example, the user can select at least one guide line from among the guide lines 810, 820 and 830, thereby preventing an image from being zoomed in or out at a zoom magnification, which is higher than a zoom magnification corresponding to the selected guide line, or a zoom magnification which is lower than the zoom magnification corresponding to the selected guide line.

For example, when it is set that the user selects the second guide line 820 to prevent an image from being zoomed in at a zoom magnification which is higher than a zoom magnification corresponding to the second guide line 820, the first guide line 830 corresponding to a zoom magnification higher than the zoom magnification corresponding to the second guide line 820 may not be displayed, or may be displayed through a predetermined graphic object to be distinguished from other guide lines.

Also, when a user input for zooming in an image at a zoom magnification higher than the zoom magnification corresponding to the second guide line 820 is sensed, the controller 180 can display, on the display unit 151, a predetermined graphic object (for example, a text object such as "disable") to show that it is impossible to zoom in an image at a requested zoom magnification.

Similarly, when it is set that the user selects the second guide line 820 to prevent an image from being zoomed in at a zoom magnification which is lower than the zoom magnification corresponding to the second guide line 820, the third guide line 810 corresponding to a zoom magnification lower than the zoom magnification corresponding to the second guide line 820 may not be displayed, or may be displayed through a predetermined graphic object to be distinguished from other guide lines. Also, when a user input for zooming in an image at a zoom magnification lower than the zoom magnification corresponding to the second guide line 820 is sensed, the controller 180 can display, on the display unit 151, a predetermined graphic object (for example, a text object such as "disable") to show that it is impossible to zoom in an image at a requested zoom magnification.

In addition to when a guide line is used as illustrated in the third drawing and fourth drawing of FIG. 8, even when a zoomed-in image is displayed along with an original image, an image corresponding to a region selected by the user can be displayed in order for the user to identify the region. That is, when the zoomed-in image and the original image are all displayed by the display unit 151, the controller 180 can display, on the display unit 151, one image in an active state according to a selection of the user, and the controller 180 can capture an image corresponding to a region, which is displayed in the active state, according to a selection of the user (for example, an input of the photographing key).

Figure 9:
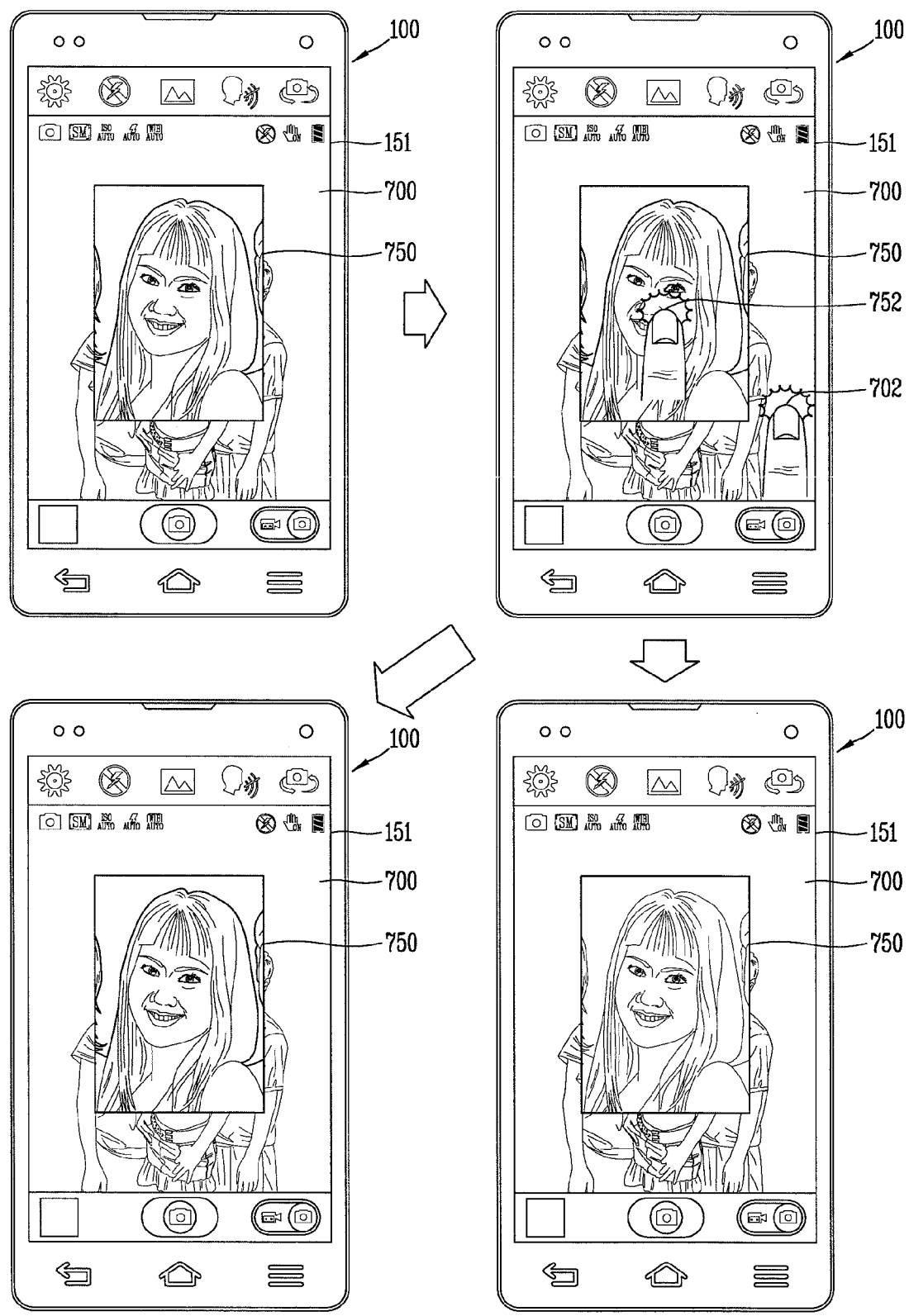
FIGS. 9 to 11 are exemplary diagrams illustrating an example of selecting one of a zoomed-in image and an original image according to a user input in a mobile terminal according to an embodiment of the present invention.
Figure 10:
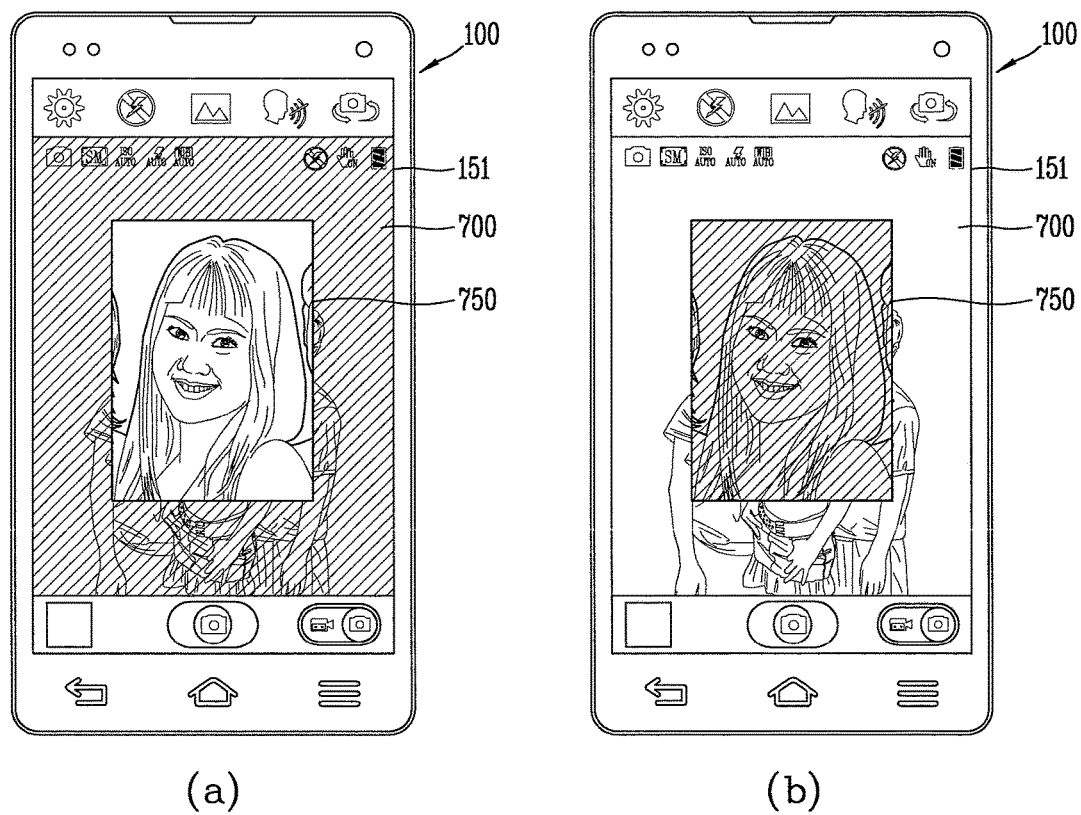
Figure 11:
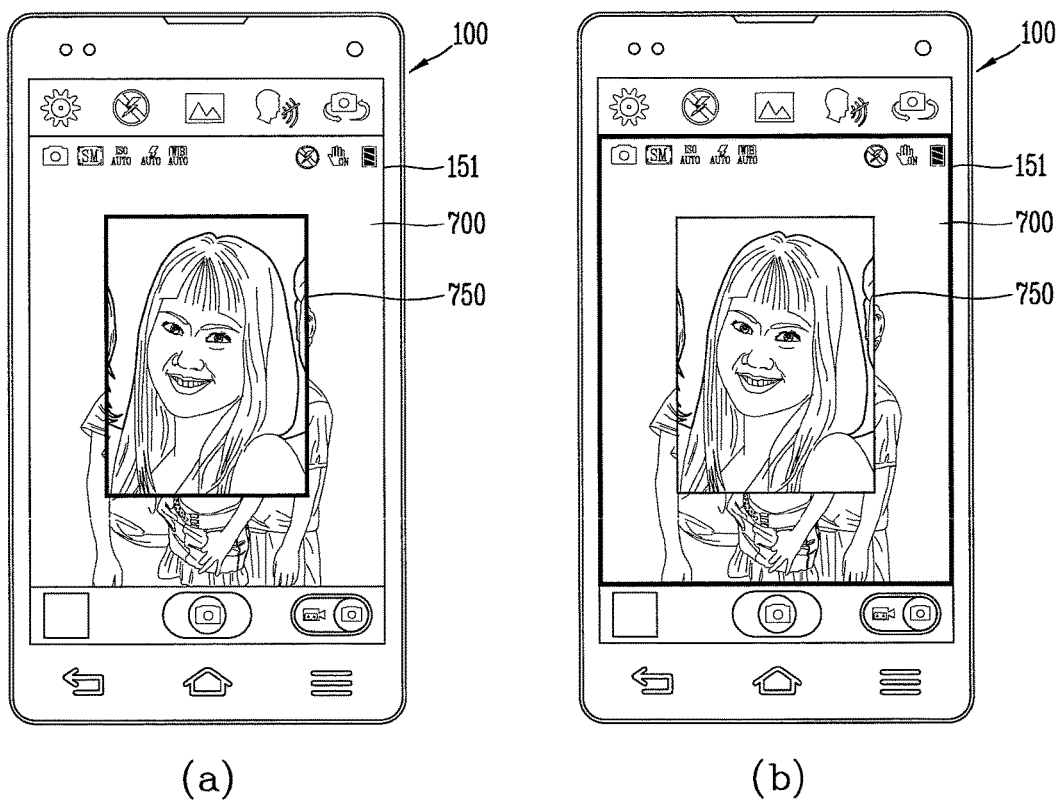

Next, FIGS. 9 to 11 illustrate an example where one image is displayed in the active state while a zoomed-in image and an original image are all being displayed by the display unit 151. To first provide description with reference to FIG. 9, a first drawing of FIG. 9 illustrates an example where a zoomed-in image 750 and an original image 700 are displayed by the display unit 151 of the mobile terminal 100 according to an embodiment of the present invention.

In this state, the controller 180 can display, on the display unit 151, one of the original image 700 and the zoomed-in image 750 in the active state according to a touch input sensed from the display unit 151. That is, as illustrated in a second drawing of FIG. 9, when the user applies a touch input (for example, a first touch input 702) to one region of the display unit 151 displaying the original image 700, the controller 180 can display, on the display unit 151, the original image 700 in the active state in response to the first touch input 702.

In this instance, in order to distinguish an image corresponding to an activated region from an image corresponding to a deactivated region, the controller 180 can display, on the display unit 151, the image (i.e., the zoomed-in image 750) corresponding to a deactivated region at a sharpness which is equal to or lower than a level of a certain sharpness. That is, as illustrated in a third drawing of FIG. 9, the controller 180 can sharply display an activated image (i.e., the original image 700) and may blurredly display a deactivated image (i.e., the zoomed-in image 750) at a predetermined level or more on the display unit 151, thereby enabling the user to determine a currently activated image as the original image 700.

Further, in the second drawing of FIG. 9, when the user applies a touch input (for example, a second touch input 752) to one region of the display unit 151 displaying the zoomed-in image 750, the controller 180 can display, on the display unit 151, the zoomed-in image 750 in the active state in response to the second touch input 752. In this instance, as illustrated in a fourth drawing of FIG. 9, the controller 180 can sharply display an activated image (i.e., the zoomed-in image 750) and may blurredly display a deactivated image (i.e., the original image 700) at a predetermined level or more on the display unit 151, thereby enabling the user to determine a currently activated image as the zoomed-in image 750.

In addition, the controller 180 can display, on the display unit 151, the activated region and the deactivated region to be distinguished from each other in an arbitrary method. For example, the controller 180 can control the display unit 151 to display a region of the display unit 151 displaying a deactivated image in a black-and-white state, or control the display unit 151 to display a region of the display unit 151 displaying an activated image and the region of the display unit 151 displaying the deactivated image by using different graphic objects. Such an example is illustrated in FIGS. 10 and 11.

For example, as illustrated in the second drawing of FIG. 9, the controller 180 can display, on the display unit 151, the zoomed-in image 750 in the active state in response to the second touch input 752 sensed from one region of the display unit 151 displaying the original image 700. In this instance, as illustrated in a first drawing of FIG. 10, the control unit 750 can control the display unit 151 to display, in black and white, regions other than a region of the display unit 151 displaying the zoomed-in image 750, thereby enabling the user to determine a currently activated image as the zoomed-in image 700.

Further, as illustrated in the second drawing of FIG. 9, the controller 180 can display, on the display unit 151, the original image 700 in the active state in response to the first touch input 752 sensed from one region of the display unit 151 displaying the zoomed-in image 750. In this instance, as illustrated in a second drawing of FIG. 10, the control unit 750 can control the display unit 151 to display, in black and white, a region of the display unit 151 displaying the zoomed-in image 750, thereby enabling the user to determine a currently activated image as the original image 700.

In addition, when the zoomed-in image 750 is activated, as illustrated in a first drawing of FIG. 11, the controller 180 can display, on the display unit 151, a periphery of a region of the display unit 151, displaying the zoomed-in image 750, as a border-shaped graphic object which is displayed to a predetermined thickness or in a predetermined color. Further, when the original image 700 is activated, as illustrated in a second drawing of FIG. 11, the controller 180 can display, on the display unit 151, a periphery of a region of the display unit 151, displaying the original image 700, as the border-shaped graphic object which is displayed to the predetermined thickness or in the predetermined color. Therefore, the controller 180 enables the user to determine what image a currently activated image is, based on the predetermined graphic object.

In FIGS. 9 to 11, the examples of enabling the user to identify a currently activated image by using a sharpness, a black-and-white image, and the predetermined graphic object have been described above, but are merely an embodiment of the present invention. In other embodiments, the currently activated image may be identified in other methods. For example, the controller 180 can semi-transparently display, on the display unit 151, a deactivated image so as to identify an activated image and the deactivated image.

Alternatively, the controller 180 can display, on the display unit 151, the deactivated image in a predetermined color, or may display at least one graphic object, which is capable of representing the active state, on a region of the display unit 151 displaying the activated image. According to the above description, the controller 180 of the mobile terminal 100 according to an embodiment of the present invention can capture a plurality of images respectively having different magnifications according to a selection of the user.

Next, FIG. 12 is a diagram illustrating an example of capturing, by the mobile terminal 100 according to an embodiment of the present invention, a plurality of images at different zoom magnifications. As shown in a first drawing of FIG. 12, the controller 180 of the mobile terminal 100 according to an embodiment of the present invention can display an original image, which is not zoomed in, in the preview state on the display unit 151 and mark a plurality of guide lines, respectively corresponding to different magnifications, on the original image.

In this instance, as illustrated in a second drawing of FIG. 12, when a plurality of user touch inputs 1250 and 1260 are respectively applied to some of a plurality of regions 1200, 1210, 1220 and 1230 divided by the guide lines, the controller 180 can receive selections of different zoom magnifications from the user according to the user touch inputs 1250 and 1260. That is, as illustrated in the second drawing of FIG. 12, when a first touch input 1260 of the plurality of touch inputs 1250 and 1260 is first applied to the region 1210 corresponding to two times zoom magnification and then a second touch input 1250 is applied to the region 1200 corresponding to one times zoom magnification, the controller 180 can capture a plurality of images based on the respective zoom magnifications.

That is, the controller 180 can capture an image which is zoomed in at a zoom magnification (i.e., two times) based on the first touch input 1260, which is first applied thereto, among the touch inputs 1250 and 1260. In this instance, the controller 180 can display, on the display unit 151, a partial region of an original image, which is currently displayed in the preview state and is captured according to current two times zoom magnification, among a plurality of the original images 700 to be distinguished from another region which is not so.

That is, the controller 180 can control the display unit 151 to display, as a black-and-white image or an image having a sharpness equal to or lower than a predetermined sharpness, the region 1200 of the original image which is currently displayed in the preview state, except a region which is to be captured in a case of being zoomed in at two times magnification. Also, the controller 180 can store an image, which is zoomed in according to two times magnification which is currently set, in the memory 170. Such an example is illustrated in a third drawing of FIG. 12.

In the third drawing of FIG. 12, when an image which is zoomed in according to two times magnification is captured, the controller 180 can capture an image according to a zoom magnification (i.e., one times) based on the second touch input 1250. Also, when the zoom magnification is one times zoom magnification, this may be the same as capturing an original image which is not zoomed in. Therefore, as illustrated in a fourth drawing of FIG. 12, the controller 180 can capture an original image which is not zoomed in, in response to the second touch input 1250.

FIG. 12 illustrates an example where two different magnifications are selected, and a plurality of zoomed-in images are captured in an order in which the different magnifications are selected, but a greater number of images may be captured. That is, in a state illustrated in the first drawing of FIG. 12, when a user touch input corresponding to different zoom magnifications No. 3 or 4 is sensed, the controller 180 can continuously capture three or four images which are zoomed in at the different zoom magnifications.

In FIG. 12, the user selecting a plurality of guide lines has been described above as an example, but a plurality of images which are zoomed in at different magnifications may be captured by using various methods. For example, the controller 180 can display, on the display unit 151, a predetermined scroll bar for setting a zoom-in function and capture a plurality of images which are zoomed in at different zoom magnifications, based on a user touch input for the scroll bar. According to the above description, the mobile terminal 100 can generate images by sequentially connecting a plurality of images which are continuously captured at different magnifications.

Figure 13:
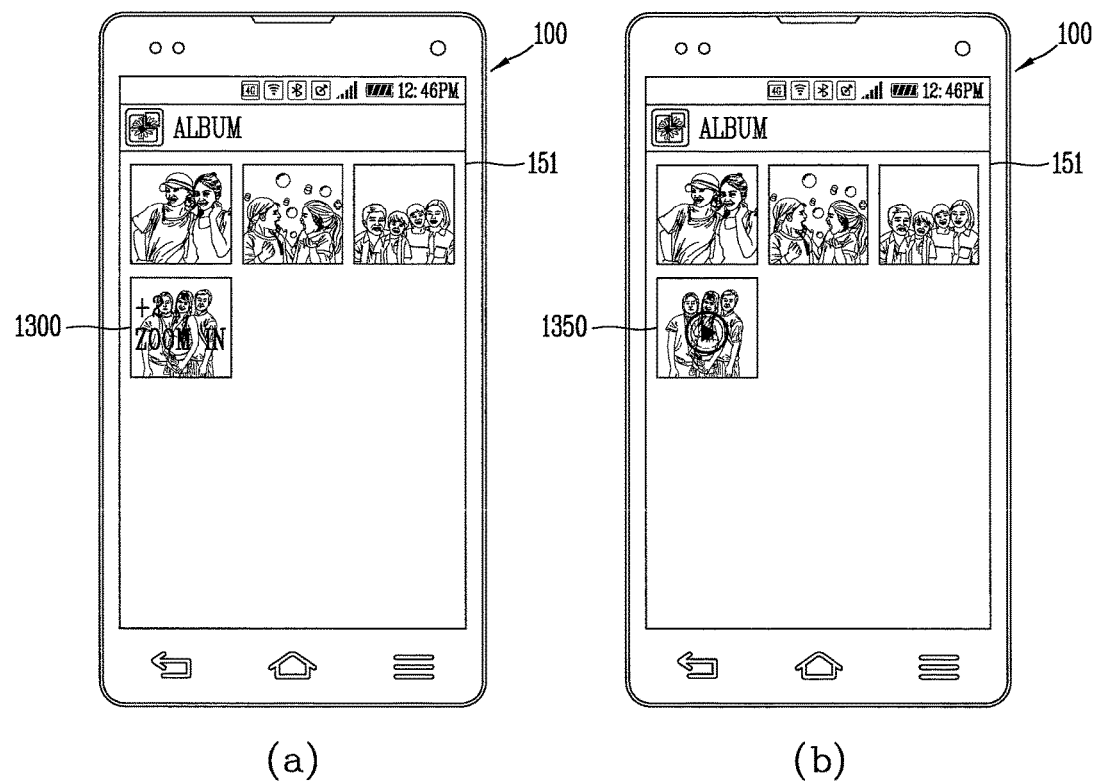
FIGS. 13 and 14 are exemplary diagrams illustrating an example of generating, by a mobile terminal according to an embodiment of the present invention, a moving image from a plurality of still images captured based on different zoom magnifications to reproduce the moving image.
Figure 14:
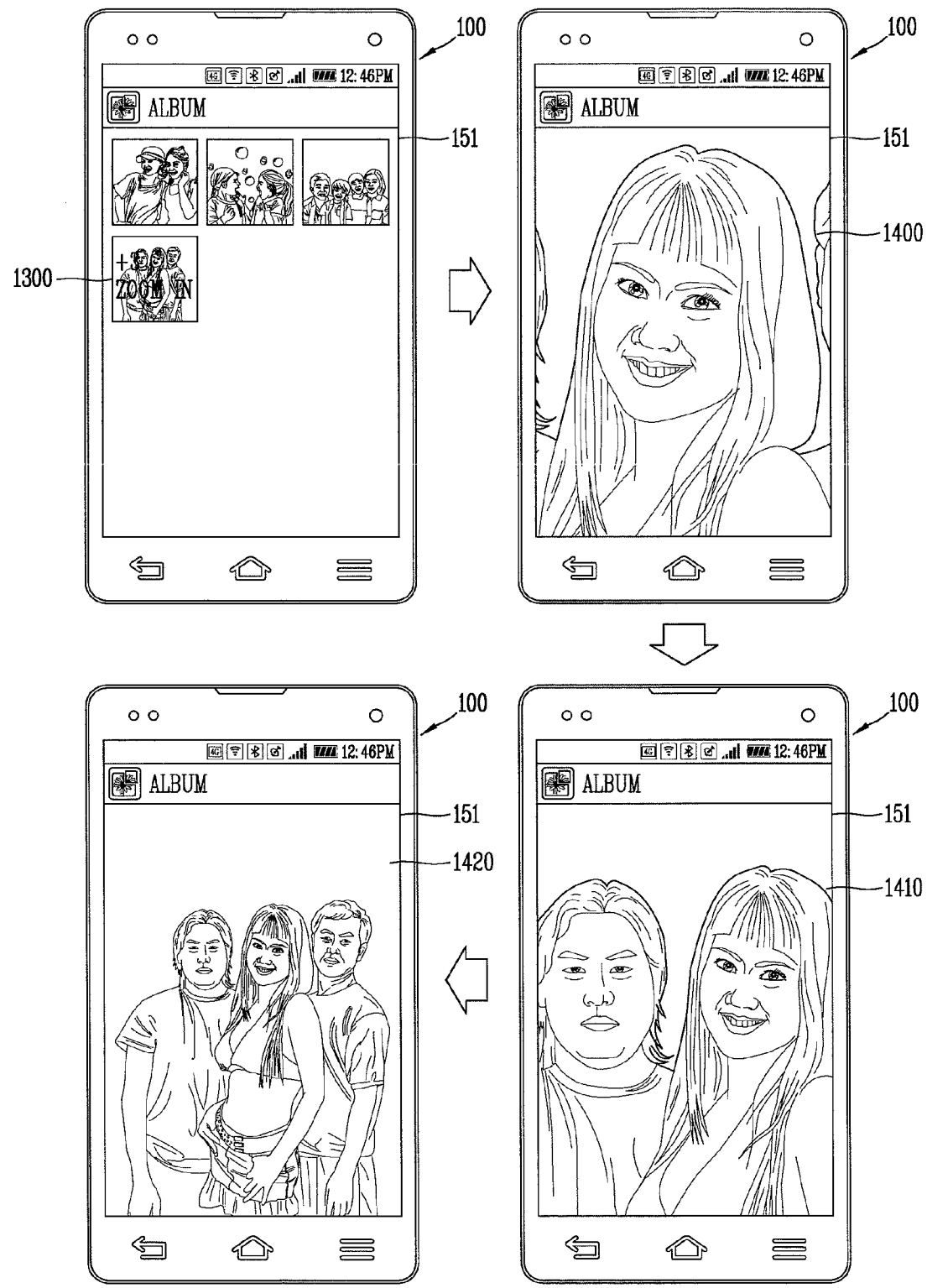

Next, FIGS. 13 and 14 are diagrams illustrating an example of generating, by the mobile terminal 100 a moving image from a plurality of still images captured based on different zoom magnifications to reproduce the moving image. In particular, FIGS. 13 (*a*) and (*b*) illustrate examples the display unit 151 displaying a plurality of stored images and a plurality of thumbnail images corresponding to a moving image. In this instance, a moving image composed of a plurality of images captured at different magnifications can be displayed to correspond to a thumbnail image which is displayed to be distinguished from an image or a moving image which is not so.

For example, as illustrated in FIG. 13 (*a*), the number of the images constituting the moving image can be marked on a thumbnail image 1300 corresponding to the moving image composed of the plurality of images which are captured at the different magnifications. Therefore, as illustrated in FIG. 12, when the moving image is composed of a plurality of images which are captured according to two different zoom magnifications, information (i.e., +2 zoom in) including the number of the images constituting the moving image may be marked on the thumbnail image 1300 corresponding to the moving image.

Further, the controller 180 can control the display unit 151 in order for a separate graphic object, corresponding to the moving image composed of the plurality of images which are captured at the different magnifications, to be marked on a thumbnail image 1350 corresponding to the moving image. Such an example is illustrated in FIG. 13 (*b*).

Next, FIG. 14 illustrates an example of reproducing a moving image composed of a plurality of images which are captured at different magnifications, according to an embodiment of the present invention. A first drawing of FIG. 14 illustrates an example where the mobile terminal 100 according to an embodiment of the present invention displays a thumbnail image 1300, corresponding to a moving image composed of a plurality of images which are captured at different magnifications as illustrated in FIG. 13 (*a*), to be distinguished from an image or a moving image which is not so.

In this state, the controller 180 can sense a selection of the user (for example, a touch input) which is made for the thumbnail image 1300. Therefore, the controller 180 can reproduce a moving image corresponding to the thumbnail image 1300 to display a plurality of photographing images, constituting the moving image, on the display unit 151.

For example, when the moving image corresponding to the thumbnail image 1300 is composed of three images captured at different magnifications like "+3 zoom in" being marked on the thumbnail image 1300, the controller 180 can sequentially display, on the display unit 151, a plurality of images in an order in which the three images are captured. Also, the three images may be images which are respectively captured according to different magnifications.

Therefore, when reproduction of the moving image corresponding to the thumbnail image 1300 is selected, as illustrated in second and third drawings of FIG. 14, the controller 180 can sequentially display, on the display unit 151, a plurality of images 1400, 1410 and 1420 captured at different zoom magnifications in an order in which the images 1400, 1410 and 1420 are captured.

In the above description, a still image captured by using an image sensed by the camera 121 has been described as an example, but the present invention is not limited thereto. For example, when an image sensed by the camera 121 starts to be recorded, the controller 180 of the mobile terminal 100 according to an embodiment of the present invention can display, on the display unit 151, an image obtained by zooming in a portion of the sensed image, based on a predetermined user touch input which is sensed in the middle of recording the sensed image. In this instance, the zoomed-in image can be displayed on the display unit 151 irrespective of the image which is being currently recorded, or be stored as a still image or a moving image separately from the recorded image according to a selection of the user.

Figure 15:
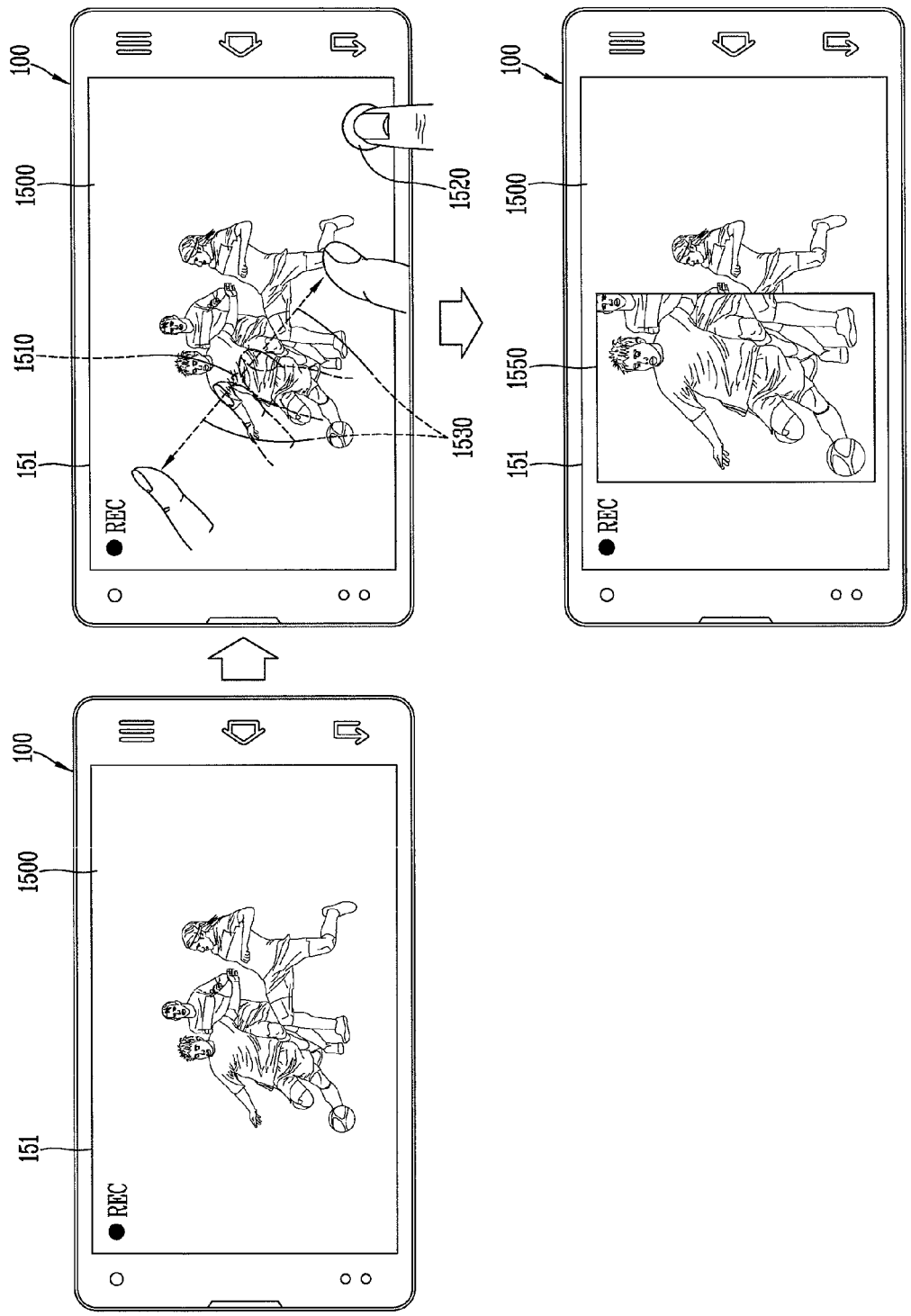
FIG. 15 is an exemplary diagram illustrating an example of zooming in, by a mobile terminal according to an embodiment of the present invention, an image corresponding to a partial region by using a predetermined touch gesture in the middle of capturing a moving image.

FIG. 15 illustrates an example of zooming in, by the mobile terminal 100 according to an embodiment of the present invention, a partial region of a recorded image when a predetermined user touch input is sensed. To provide description with reference to FIG. 15, a first drawing of FIG. 15 illustrates an example of recording an image sensed by the camera 121. In this state, the controller 180 can zoom in a portion of the recorded image and display a zoomed-in image on the display unit 151 according to whether a predetermined user touch input, without affecting the recorded image.

That is, as illustrated in a second drawing of FIG. 15, when a user touch input sensed from one point of the display unit 151 is held, the controller 180 can sense, like a pinch-out gesture 1530, a touch gesture for zooming in a portion of an image displayed by the display unit 151. Also, when the held touch input and the pinch-out gesture are sensed, the controller 180 can determine the pinch-out gesture as a predetermined touch input for zooming in and displaying a portion of the recorded image without affecting the recorded image.

Therefore, the controller 180 can zoom in a partition region of the currently recorded image according to a zoom magnification based on the predetermined touch input (i.e., the pinch-out gesture) to display a zoomed-in image on the display unit 151. In this instance, the controller 180 can display an image, obtained by zooming in one point 1510 of the display unit 151 based on the predetermined touch input (i.e., the pinch-out gesture), on one region of the display unit 151 which is provided with respect to the one point 1510. Such an example is illustrated in a third drawing of FIG. 15.

As illustrated in FIG. 15, according to the present embodiment, even when a partial region of the currently recorded image is zoomed in and displayed, an image is recorded irrespective of the zoom-in operation. That is, when the zoom-in operation is performed according to the predetermined touch input, the controller 180 according to an embodiment of the present invention can capture an image corresponding to the zoomed-in region from the currently recorded image and may zoom in the captured image to display the zoomed-in image on the display unit 151, and thus, a portion of the currently recorded image can be zoomed in at a specific zoom magnification and displayed irrespective of the currently recorded image.

In this instance, the controller 180 of the mobile terminal 100 according to an embodiment of the present invention can store the currently recorded image and simultaneously store information about changing of a zoom magnification which is sensed in the middle of recording the image. Here, the information about the changing of the zoom magnification may include a magnification at which the image is zoomed in, a time when a user input for performing the zoom-in operation is received, and information of one point of the display unit 151 to which a touch input corresponding to the zoom-in operation is applied.

Also, the stored information about the changing of the zoom magnification may be displayed through a predetermined graphic object when reproducing the recorded moving image. Even when performing a zoom-out operation in addition to the zoom-in operation, the information about the changing of the zoom magnification may include a magnification at which the image is zoomed out, a time when a user input for performing the zoom-out operation is received, and information of one point of the display unit 151 to which a touch input corresponding to the zoom-out operation is applied.

Figure 16:
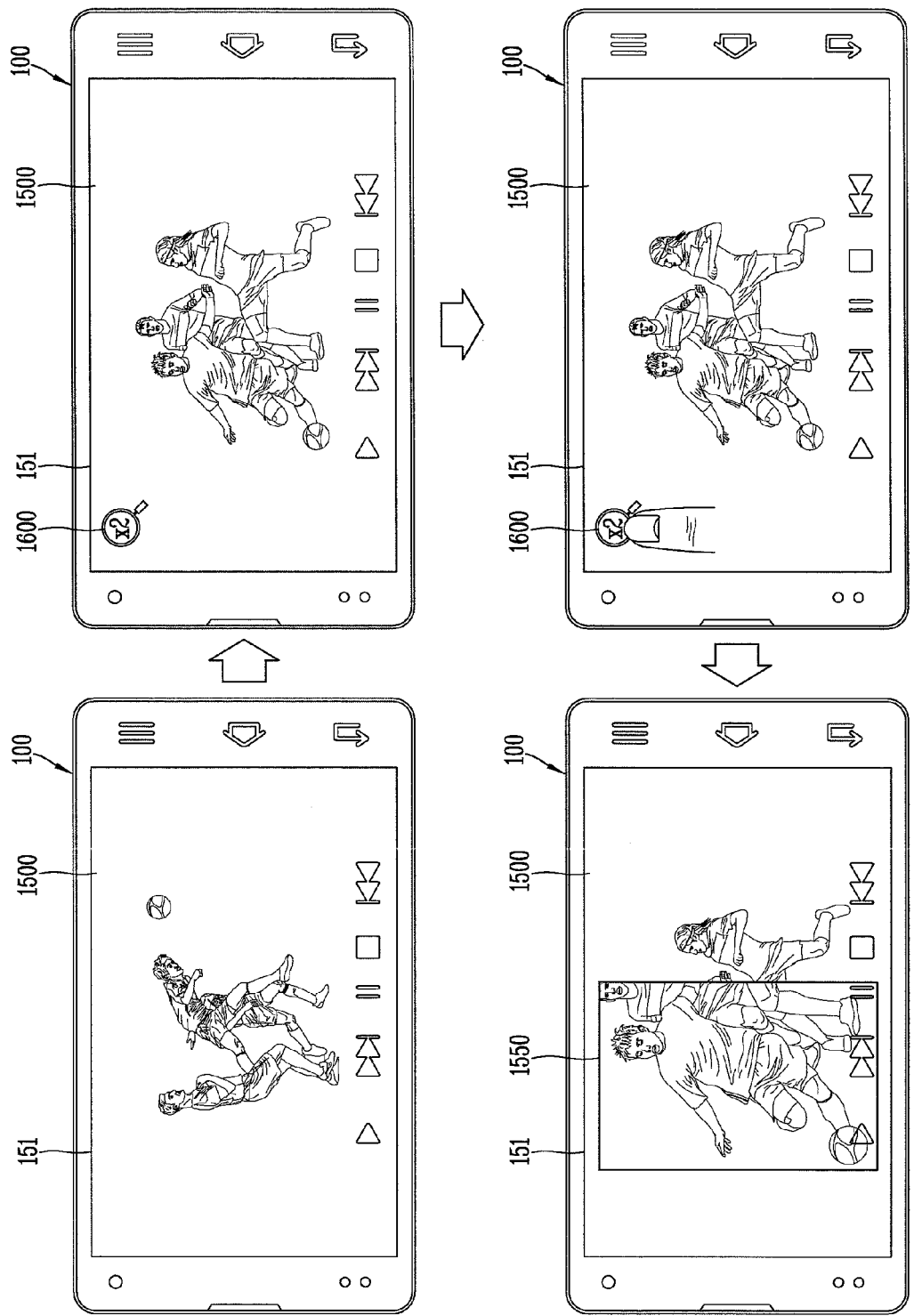
FIG. 16 is an exemplary diagram illustrating an example of displaying, by a mobile terminal according to an embodiment of the present invention, a region zoomed in from a captured moving image and an image corresponding to the zoomed-in region.

FIG. 16 is a diagram illustrating an example of displaying, by the mobile terminal 100 according to an embodiment of the present invention, a region zoomed in from a captured moving image and an image corresponding to the zoomed-in region. For example, a first drawing of FIG. 16 illustrates an example of reproducing a recorded moving image according to an embodiment of the present invention.

Here, the recorded moving image may be a moving image for which a zoom magnification has been changed at least once or more in the middle of being recorded, and in FIG. 15, it is assumed that the recorded moving image is reproduced. Also, as illustrated in FIG. 15, when the zoom magnification is changed according to a predetermined touch input in the middle of recording the moving image, the controller 180 can record the moving image without changing the zoom magnification, and various pieces of information about the changed zoom magnification may be stored along the recorded moving image.

As illustrated in the first drawing of FIG. 16, when the recorded moving image is reproduced, an image corresponding to a time when the zoom magnification is changed according to the predetermined touch input of the user can be reproduced. In this instance, as illustrated in a second drawing of FIG. 16, the controller 180 can display a graphic object 1600, including the information about the changed zoom magnification, on the display unit 151.

For example, the controller 180 can display the graphic object 1600 at the time when the zoom magnification is changed, based on the information (for example, the information about the changing of the zoom magnification) which is stored along with the recorded moving image. In this instance, the controller 180 can previously display the graphic object 1600 several seconds before the zoom magnification is changed, in order for the user to identify the time when the zoom magnification is changed.

When the graphic object 1600 is displayed by the display unit 151, the controller 180 can sense a user input which is made for the graphic object 1600. That is, as illustrated in a third drawing of FIG. 16, when a user touch input which is made for the graphic object 1600 is sensed, the controller 180 can display, on the display unit 151, an image which is zoomed in according to pre-stored information about a zoom magnification, with respect to one point of a currently reproduced moving image. That is, as illustrated in the third drawing of FIG. 16, the controller 180 can display, on the display unit 151, a zoomed-in image 1550 illustrated in a fourth drawing of FIG. 16 in response to the user touch input which is made for the graphic object 1600.

In the description of FIG. 16, the graphic object 1600 being displayed only when a portion for which the zoom magnification has been changed is reproduced in the middle of reproducing the recorded moving image has been described as an example, but the present embodiment is not limited thereto. In other embodiments, when the recorded moving image starts to be reproduced, whether to display an image for which the zoom magnification has been changed may be selected by the user. In this instance, when an image corresponding to the portion for which the zoom magnification has been changed is reproduced, the controller 180 can display the zoomed-in image 1550 on the display unit 151 even without the user touch input which is made for the graphic object 1600.

In addition, in FIG. 16, only the graphic object 1600 for receiving a selection of the user which is made for whether to display the zoomed-in image 1550 is displayed by the display unit 151 has been described as an example, but the present embodiment is not limited thereto. In other embodiments, a graphic object for terminating displaying of the zoomed-in image 1550 may be further displayed. In this instance, when the graphic object for terminating displaying of the zoomed-in image 1550 is selected, the controller 180 can no longer display the zoomed-in image 1550 on the display unit 151. In this instance, only a screen on which the recorded moving image is reproduced may be displayed by the display unit 151.

In addition, the mobile terminal 100 according to an embodiment of the present invention may capture an image, sensed by the mobile terminal 100, through another device connected to the mobile terminal 100. In this instance, the connected other device may include a user interface which differs from a user interface displayed by the mobile terminal 100, based on the characteristic of a corresponding device.

Figure 17:
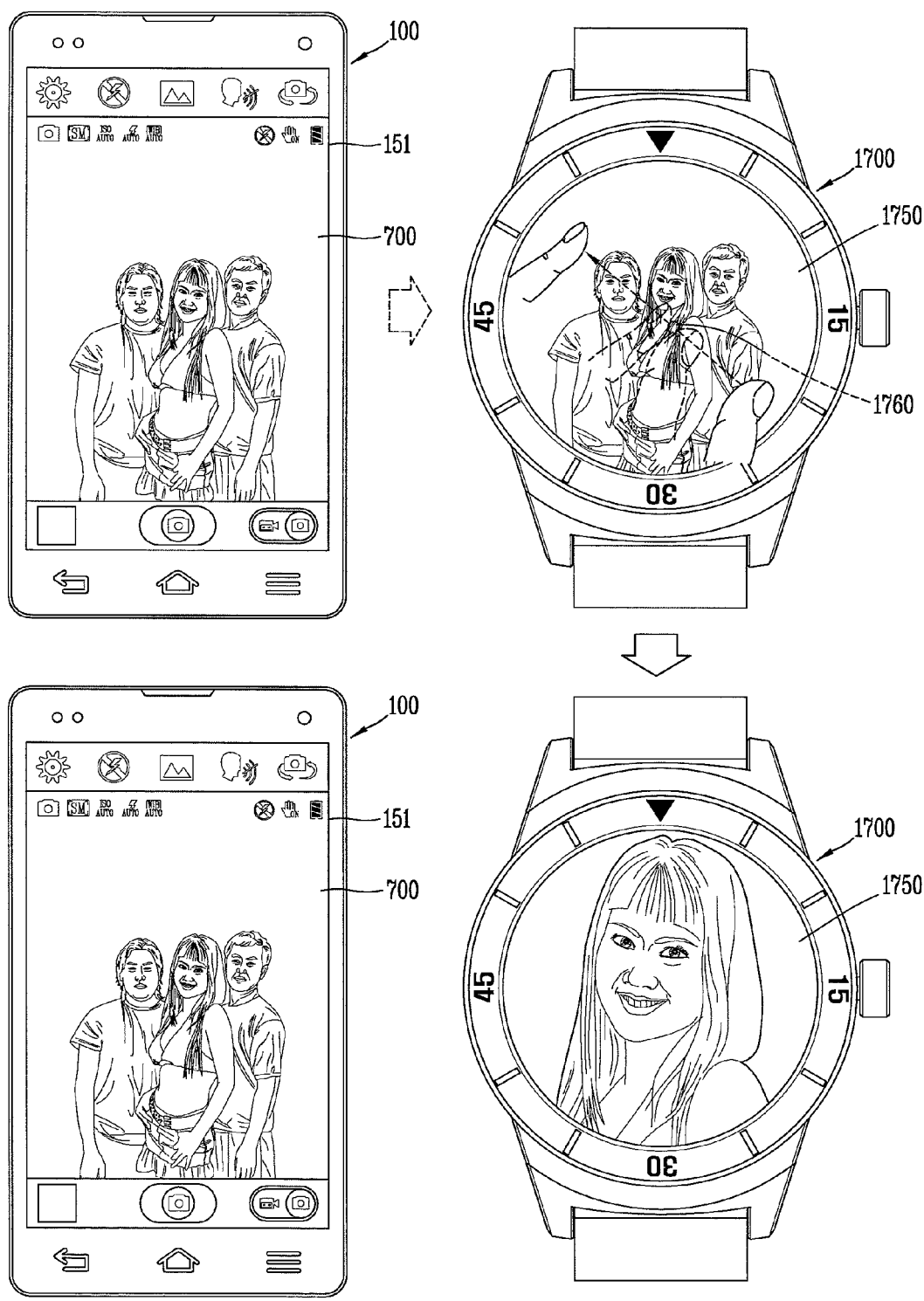
FIG. 17 is an exemplary diagram illustrating an example of capturing, by a mobile terminal according to an embodiment of the present invention, an image which is sensed by the mobile terminal through another device connected thereto.

FIG. 17 illustrates an example of capturing, by the mobile terminal 100 according to an embodiment of the present invention, an image which is sensed by the mobile terminal 100 through another device connected thereto. In particular, a first drawing of FIG. 17 illustrates an example where an image sensed through the camera 121 of the mobile terminal 100 is displayed by the display unit 151. In this instance, the mobile terminal 100 can be connected to another predetermined device, namely, a device such as a smart watch 1700 or the like and may be controlled according to a user input sensed through the smart watch 1700.

Therefore, as illustrated in a second drawing of FIG. 17, an image sensed by the camera 121 of the mobile terminal 100 can be displayed by a display unit 1750 of the smart watch 1700 connected to the mobile terminal 100. In this instance, a controller of the smart watch 1700 may be controlled differently from the mobile terminal 100 according to a user touch input.

That is, as illustrated in the second drawing of FIG. 17, when a predetermined touch input such as a pinch-out input is applied to the mobile terminal 100, the controller 180 of the mobile terminal 100 can zoom in a portion of the image sensed by the camera 121 to transmit a zoomed-in image to the smart watch 1700, based on a user input sensed through the smart watch 1700. Therefore, as illustrated in the third drawing of FIG. 17, the display unit 1750 of the smart watch 1700 can display an image which is obtained by zooming in a portion of the image sensed by the camera 121 of the mobile terminal 100, based on a zoom magnification based on the pinch-out input. Further, the display unit 151 of the mobile terminal 100 can display an original image which is not zoomed in.

Therefore, as illustrated in the third drawing of FIG. 17 and a fourth drawing of FIG. 17, the display unit 1750 of the smart watch 1700 and the display unit 151 of the mobile terminal 100 can display different screens. In this instance, the controller 180 can display, on the display unit 151, an image which is zoomed in through the smart watch 1700 and may store the image sensed by the camera 121 of the mobile terminal 100 according to a user input sensed through the smart watch 1700. That is, according to the present embodiment, in a state where the user checks in detail a state of a subject through a zoom-in operation performed through the smart watch 1700, the user can allow the mobile terminal 100 to capture an image which is not zoomed in.

In addition, when the display unit 1750 of the smart watch 1700 and the display unit 151 of the mobile terminal 100 display different screens, the controller 180 of the mobile terminal 100 can store one of a zoomed-in image and the image sensed by the camera 121 of the mobile terminal 100, based on a device which senses a photographing signal from the user. That is, when the photographing signal is sensed through the smart watch 1700, the controller 180 can store an image (see the third drawing of FIG. 17) which is zoomed in at a zoom magnification based on the pinch-out input, or when the photographing signal is sensed through the mobile terminal 100, the controller 180 can store an image (see the fourth drawing of FIG. 17) sensed by the camera 121.

In the above description, capturing an image sensed by only one camera included in the mobile terminal 100 has been described as an example, but the present embodiment is not limited thereto. In other embodiments, when two or more cameras (for example, a front camera, a rear camera, and/or the like) are included in the mobile terminal 100, the present invention can be applied to capturing images sensed through the cameras. In this instance, the controller 180 can display an image, which is zoomed in from an image sensed by the front camera or the rear camera, on the display unit 151 and capture the image displayed by the display unit 151 to generate a moving image.

In the above description, displaying a zoomed-in image when an image sensed by a camera is zoomed in has been described as an example, but the present embodiment is not limited thereto. In other embodiments, a portion of the sensed image may not be displayed due to the zoom-in operation. For example, due to the zoom-in operation, an image can deviate from an angle of view that enables the camera to sense the image. Therefore, when the image deviates from the angle of view enabling the camera to sense the image due to the zoom-in operation, the controller 180 can inform the user of the case and display, on the display unit 151, guide information that allows the user to change the angle of view of the camera by moving a position of the camera.

In the above description, a portion of an image sensed by the camera is zoomed in at a specific zoom magnification according to a selection of the user has been described as an example, but the present embodiment is not limited thereto. In other embodiments, the zoom magnification may be automatically determined based on a predetermined condition. For example, when a focal point is adjusted to a specific subject according to a selection of the user, the controller 180 can automatically change the zoom magnification according to a moving speed of the specific subject. That is, as the moving speed of the specific subject becomes faster, the controller 180 can zoom in or out an image at a high zoom magnification, and as the moving speed of the specific subject becomes slower, the controller 180 can zoom in or out the image at a low zoom magnification.

The zoom-in operation or the zoom-out operation can be determined based on a moving direction of the specific subject. That is, when the specific subject is close to the mobile terminal 100, the controller 180 can perform the zoom-out operation, and when the specific subject is far away from the mobile terminal 100, the controller 180 can perform the zoom-in operation.

Accordingly, embodiments of the present invention provide the following advantages. First, the mobile terminal can simultaneously display an image sensed by a camera and an image zoomed in or out from the sensed image and capture one image based on a selection of a user among the displayed images, thereby enabling the user to more easily capture the zoomed-in or zoomed-out image or the sensed image.

In addition, when an image sensed by the camera is zoomed in and displayed, the sensed image may be captured. Accordingly, the user can capture an image while checking in detail a state of a specific subject included in the sensed image.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a camera configured to obtain an image;
a display configured to display the obtained image; and
a controller configured to:
display guide lines respectively corresponding to predetermined zoom magnification levels on the displayed image, when receiving a zoom input for zooming in on the displayed image,
receive a selection of any one of the guide lines,
zoom and display a portion of the obtained image according to a zoom magnification level of the selected guide line, and
capture at least one of the displayed image and the zoomed image in response to a predetermined input,
wherein the controller is further configured to:
store the obtained image as a moving image,
in response to a changing of a zoom magnification while storing the moving image, store information about the changed zoom magnification along with the stored moving image, and
display a graphic object including information about the changed zoom magnification in response to an image corresponding to a time when the zoom magnification is changed being reproduced while reproducing the stored moving image.

2. The mobile terminal of claim 1, wherein the controller is further configured to activate one of the displayed image and the zoomed image, deactivate the other one of the displayed image and the zoomed image and store the activated image in a memory in response to a selection of the user.

3. The mobile terminal of claim 2, wherein the controller is further configured to distinctively display the activated image and the deactivated image from each other on the display using at least one of colors and sharpness of the displayed images and a graphic object displayed near a region of the displayed images.

4. The mobile terminal of claim 1, wherein the controller is further configured to:
zoom in a partial region of the displayed image with respect to the zoom input, and
display the zoomed image on a predetermined region of the display provided with respect to the zoom input.

5. The mobile terminal of claim 4, wherein the controller is further configured to determine a size of the predetermined region based on a zoom-in or zoom-out magnification according to the zoom input.

6. The mobile terminal of claim 1, wherein the zoomed image comprises a plurality of images zoomed in or out at different magnifications, and
wherein the controller is further configured to store the plurality of images in a memory, in an order selected by a user.

7. The mobile terminal of claim 6, wherein the controller is further configured to:
create a moving image including the plurality of images, and
sequentially display the plurality of images included in the moving image in the selected order on the display.

8. The mobile terminal of claim 7, wherein the controller is further configured to display a thumbnail image corresponding to the moving image, and
wherein the thumbnail image comprises information about a number of the plurality of images included in the moving image.

9. The mobile terminal of claim 1, wherein the controller is further configured to zoom the displayed image according to a zoom magnification corresponding to a selected corresponding guide line.

10. The mobile terminal of claim 1, wherein the controller is further configured to limit a zoom-in operation or a zoom-out operation performed based on a zoom magnification higher than the zoom magnification corresponding to the selected guide line, or limit the zoom-in operation or the zoom-out operation performed based a zoom magnification lower than the zoom magnification corresponding to the selected guide line.

11. The mobile terminal of claim 1, wherein the information about the changed zoom magnification comprises a magnification at which a zoom-in operation or a zoom-out operation is performed, a time when a user input for performing the zoom-in operation or the zoom-out operation is received, and information of one point of the display to which a touch input corresponding to the zoom-in operation or the zoom-out operation is applied.

12. The mobile terminal of claim 1, wherein the controller is further configured to display an image, which is zoomed in or out at the changed zoom magnification, on at least a portion of the display in which the stored moving image is reproduced, based on a selection of the graphic object.

13. The mobile terminal of claim 1, wherein the camera is further configured to sense an image of a specific subject in the obtained image, and
wherein the controller is further configured to select a zoom magnification, based on a moving speed of the specific subject and display an image, which is zoomed in or out at the determined zoom magnification, on a portion of the display.

14. The mobile terminal of claim 13, wherein the controller is further configured to perform the zoom-in operation or the zoom-out operation according to a distance between the camera and the specific subject being changed.

15. The mobile terminal of claim 1, wherein the controller is further configured to:
in response to a predetermined peripheral device being connected to the mobile terminal, display the zoomed image on the connected peripheral device instead of the display, based on a user touch input sensed through the peripheral device, and store the displayed image, based on a user input sensed through the peripheral device.

16. A method of controlling a mobile terminal, the method comprising:

obtaining, via a camera of the mobile terminal, an image;

displaying, via a display of the mobile terminal, the obtained image;

receiving, via a controller of the mobile terminal, a zoom input for zooming in on the displayed image;

displaying guide lines respectively corresponding to predetermined zoom magnification levels on the displayed image;

receiving a selection of any one of the guide lines;

zooming and displaying, via the display, a portion of the obtained image according to a zoom magnification level of the selected guide line;

capturing, via the camera, at least one of the displayed image and the zoomed image in response to a predetermined input;

storing the obtained image as a moving image;

storing information about the changed zoom magnification along with the stored moving image, in response to a changing of a zoom magnification while storing the moving image; and displaying a graphic object including information about the changed zoom magnification in response to an image corresponding to a time when the zoom magnification is changed being reproduced while reproducing the stored moving image.

* * * * *